United States Patent
Sakurai et al.

(10) Patent No.: US 7,483,202 B2
(45) Date of Patent: Jan. 27, 2009

(54) IMAGE DISPLAY PANEL AND IMAGE DISPLAY DEVICE

(75) Inventors: Ryo Sakurai, Tokyo (JP); Hidetoshi Hiraoka, Tokyo (JP); Taichi Kobayashi, Tokyo (JP); Hirotaka Yamazaki, Tokyo (JP); Hajime Kitano, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/053,359

(22) Filed: Mar. 21, 2008

(65) Prior Publication Data

US 2008/0174854 A1 Jul. 24, 2008

Related U.S. Application Data

(62) Division of application No. 10/546,773, filed as application No. PCT/JP04/02159 on Feb. 25, 2004, now Pat. No. 7,369,299.

(30) Foreign Application Priority Data

| | | | |
|---|---|---|---|
| Feb. 25, 2003 | (JP) | | 2003-047377 |
| Jun. 12, 2003 | (JP) | | 2003-167898 |
| Jun. 12, 2003 | (JP) | | 2003-167914 |
| Jun. 20, 2003 | (JP) | | 2003-176733 |
| Oct. 2, 2003 | (JP) | | 2003-344499 |
| Feb. 12, 2004 | (JP) | | 2004-034806 |

(51) Int. Cl.
 *G02B 26/00* (2006.01)
 *G09G 3/34* (2006.01)
(52) U.S. Cl. ...................... 359/296; 345/107
(58) Field of Classification Search ............. 345/107; 359/296; 428/402.21; 430/108.1, 137.14
See application file for complete search history.

(56) References Cited

U.S. PATENT DOCUMENTS 6,245,690 B1 6/2001 Yau et al.

(Continued)

FOREIGN PATENT DOCUMENTS

JP 59-171931 A 9/1984

(Continued)

*Primary Examiner*—David N Spector
(74) *Attorney, Agent, or Firm*—Sughrue Mion, PLLC

(57) ABSTRACT

In an image display panel: in which at least one group of particles or liquid particles is sealed between opposed substrates, at least one of two substrates being transparent; in which the particles or the liquid powders, to which an electrostatic field is applied, are made to move so as to display an image; and in which partition walls arranged between the substrates according to need, use is made of the substrate in which at least a surface, to which the particles or the liquid powders are contacted, is subjected to a hydrophobic treatment (first aspect), at least a surface of the partition wall, to which the particles or the liquid powders are contacted, is subjected to a hydrophobic treatment (second aspect), at least a surface of the partition wall, to which the particles or the liquid powders are contacted, is coated by a material having a small charge decay property (third aspect), a universal hardness of a binder resin used for a material constituting the partition wall is not less than 400 N/mm², which is obtained by a method of measuring a universal hardness in which the binder resin constituting the partition wall having a thickness of 3 μm is formed on a glass substrate having a universal hardness of 2000 N/mm² (fourth aspect), a ratio Lh/Lw between a height Lh and a width Lw of the partition wall satisfies 0.5≦Lh/Lw≦20 (fifth aspect), and the partition wall has a predetermined drying function (sixth aspect).

15 Claims, 10 Drawing Sheets

U.S. PATENT DOCUMENTS

| | | |
|---|---|---|
| 6,844,958 B2 * | 1/2005 | Kawai ....................... 359/296 |
| 6,862,016 B2 | 3/2005 | Matsuura et al. |
| 7,230,751 B2 | 6/2007 | Whitesides et al. |
| 2006/0087489 A1 | 4/2006 | Sakurai et al. |

FOREIGN PATENT DOCUMENTS

| | | |
|---|---|---|
| JP | 2002-014381 A | 1/2002 |
| JP | 2002-202532 A | 7/2002 |

* cited by examiner

FIG. 9
(a)
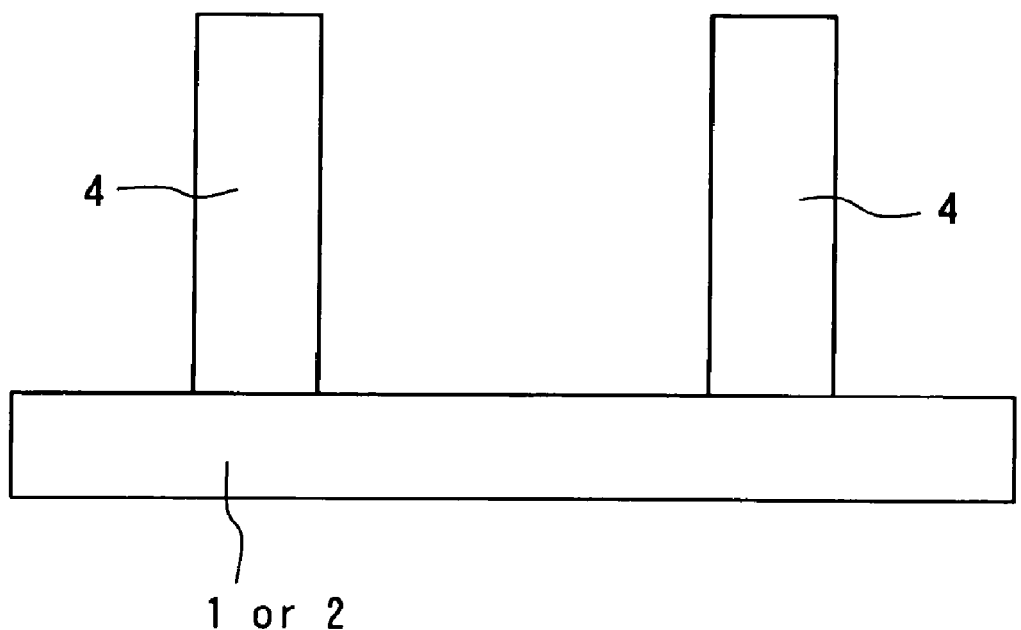
(b)
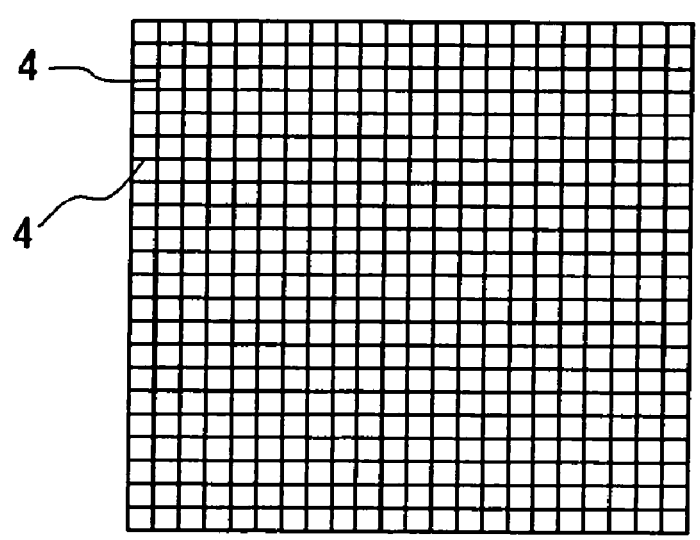

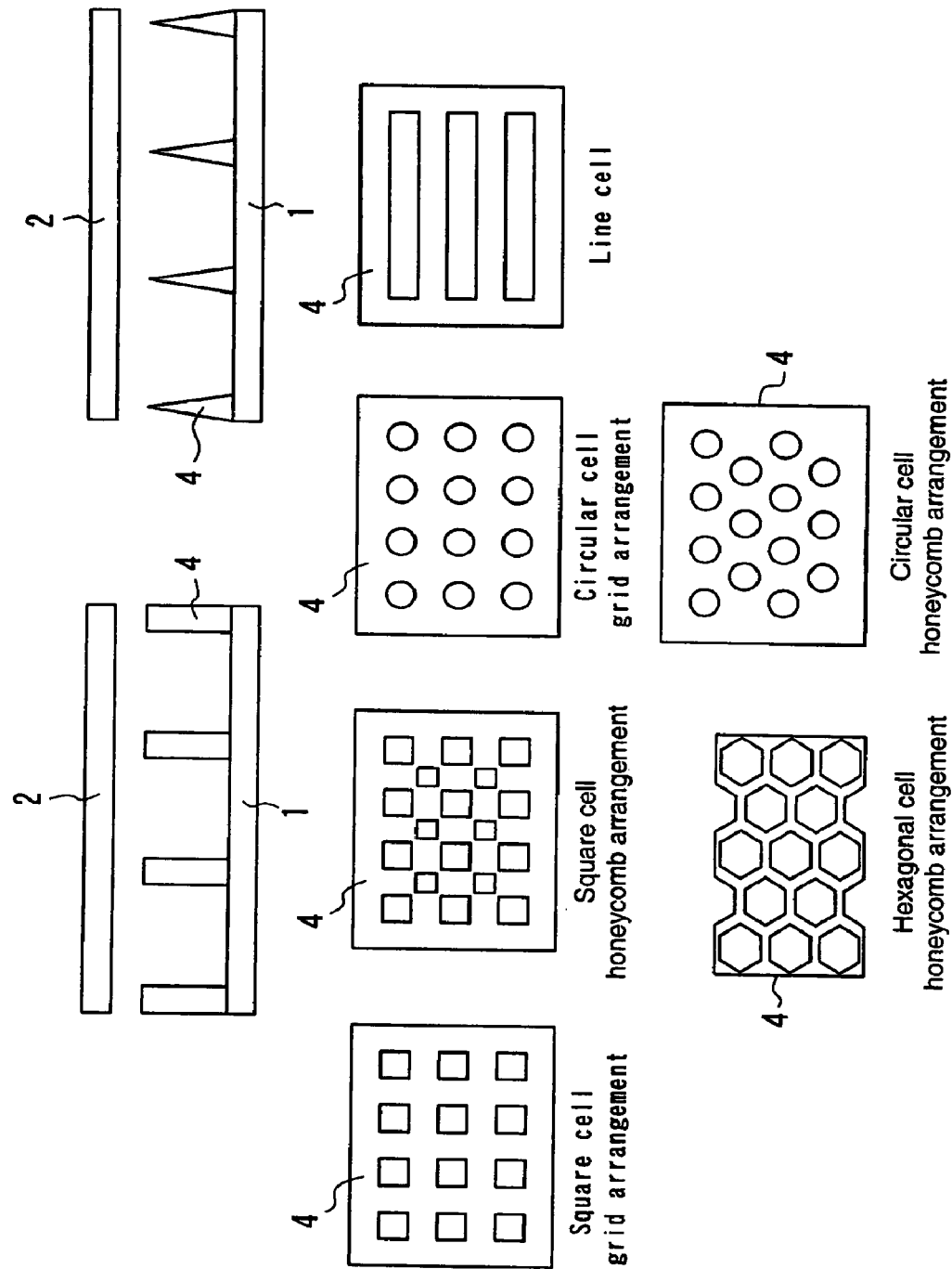

IMAGE DISPLAY PANEL AND IMAGE DISPLAY DEVICE

CROSS-REFERENCE TO RELATED APPLICATIONS

This is a Divisional Application of U.S. application Ser. No. 10/546,773 filed Aug. 24, 2005 now U. S. Pat. No. 7,369, 299, which is a National Stage Application filed under §371 of PCT Application No. PCT/JP2004/002159 filed Feb. 25, 2004; the entire disclosure of the prior application is considered part of the disclosure of the accompanying Divisional Application and is hereby incorporated by reference.

TECHNICAL FIELD

The present invention relates to an image display panel, and particularly relates to an image display device and an image display panel used for a reversible image display device that enables repeated display images accompanied by flight and movement of particles utilizing Coulomb's force and so on.

BACKGROUND ART

As an image display device substitutable for liquid crystal display (LCD), image display devices with the use of technology such as an electrophoresis method, an electro-chromic method, a thermal method, dichroic-particles-rotary method are proposed.

As for these image display devices, it is conceivable as inexpensive visual display device of the next generation from a merit having wide field of vision close to normal printed matter, having smaller consumption with LCD, spreading out to a display for portable device, and an electronic paper is expected. Recently, an electrophoresis method is proposed that microencapsulates dispersion liquid made up with dispersion particles and coloration solution and disposes the liquid between faced substrates.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide are scattered within solution of low specific gravity, it is easy to subside, difficult to maintain a stability of dispersion state. Even in the case of microencapsulation, cell size is diminished to a microcapsule level in order to make it hard to appear; however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan, "Japan Hardcopy '99" (Jul. 21-23, 1999) Transaction Pages 249-252.] However, the structure becomes complicated because the charge transport layer and further a charge generation layer are to be arranged. In addition, it is difficult to constantly dissipate charges from the electro-conductive particles, and thus there is a drawback on the lack of stability.

However, in the case such that a surface of a substrate, to which particles or liquid powders to be sealed having an excellent mobility are contacted, has such a state that a material constituting the substrate is exposed as it is, durability for a repetition use is insufficient when it is used as the image display panel. That is, even in the particles and the liquid powders, there occurs a phenomenon during the repetition use such that the particles or the liquid powders are adhered to the surface of the substrate and don't move, and there is a problem such that a contrast of the image is deteriorated (task to be solved by a first aspect of the invention).

Moreover, in the case such that a surface of a substrate or a partition wall, to which particles or liquid powders to be sealed having an excellent mobility are contacted, has such a state that a material constituting the substrate or the partition wall is exposed as it is, durability for a repetition use is insufficient when it is used as the image display panel. That is, even in the particles and the liquid powders, there occurs a phenomenon during the repetition use such that the particles or the liquid powders are adhered to the surface of the substrate or the partition wall and don't move, and there is a problem such that a contrast of the image deteriorates. As a result, it is insufficient on the durability for the repetition use (task to be solved by the second to the fourth aspects of the invention).

In order to solve the problems mentioned above, there is known an image display device which comprises an image display panel, in which one or more groups of particles are sealed in a plurality of cells formed by partition walls between two substrates, at least one of two substrates being transparent, and, in which the particles, to which an electrostatic field produced by electrodes provided to both of the substrates is applied, are made to fly and move so as to display an image by utilizing Coulomb's force.

In the image display device mentioned above, an opening rate of the cell is varied due to a shape of the partition wall, for example, when the partition wall is formed on a glass substrate by means of a photo-resist and a plurality of cells are constructed between two substrates. Therefore, in the case such that a ratio between a height Lh and a width Lw of the partition wall is set at a value out of an adequate range, there occurs a decrease of the opening rate and a deterioration of a manufacturing property. This problem occurs in the same manner even in an image display device which comprises an image display panel in which liquid powders composed of a solid material stably floating as a dispersoid in a gas and exhibiting a high fluidity in an aerosol state or particles are sealed in a plurality of cells formed by partition walls between opposed substrates, at least one substrate being transparent, and, in which the liquid powders or the particles, to which an electrostatic field is applied from two kinds of electrodes having different potentials, are made to fly and move so as to display an image (task to be solved by a fifth aspect of the invention).

Moreover, in the image display device mentioned above, it is possible to control humidity in the device preferably without using a drying agent, for example, by adding a drying function to the partition wall. However, when the partition wall is made of a material having a water absorption property in order to achieve the drying function mentioned above, it is important to control a water absorption rate of the partition wall. In the case such that a water absorption rate of the partition wall is set at a value out of an adequate range, there occurs a case such that a water absorption effect becomes insufficient or water is excessively absorbed during a device assembly process, so that a display property is affected. This problem occurs in the same manner even in an image display device which comprises an image display panel in which liquid powders composed of a solid material stably floating as a dispersoid in a gas and exhibiting a high fluidity in an aerosol state or particles are sealed in a plurality of cells formed by partition walls between opposed substrates, at least one substrate being transparent, and, in which the liquid powders or the particles, to which an electrostatic field is applied from two kinds of electrodes having different potentials, are made to fly and move so as to display an image (task to be solved by a sixth aspect of the invention).

DISCLOSURE OF INVENTION

Objects of the first to the fourth aspects of the invention are to eliminate the drawbacks mentioned above and to provide an image display panel and an image display device, which are inexpensive and have excellent repetition durability even in the case of using the particles having an excellent mobility and in the case of using the liquid powders.

Moreover, an object of the fifth aspect of the invention is to eliminate the drawback mentioned above and to provide an image display device, in which both of the opening rate and the manufacturing property can be assured by designing a shape of the partition wall in such a manner that a ratio between the height Lh and the width Lw of the partition wall is in an adequate range.

Further, an object of the sixth aspect of the invention is to eliminate the drawback mentioned above and to provide an image display device, in which an atmosphere in the device can be made to be even without using a drying agent by adding a predetermined drying function to the partition wall.

According to the first aspect of the invention, an image display panel: in which at least one group of particles or liquid particles is sealed between opposed substrates, at least one of two substrates being transparent; and in which the particles or the liquid powders, to which an electrostatic field is applied, are made to move so as to display an image; is characterized in that use is made of the substrate in which at least a surface, to which the particles or the liquid powders are contacted, is subjected to a hydrophobic treatment.

As preferred embodiments of the image display panel according to the first aspect of the invention, there are cases: such that as the substrate in which the surface, to which the particles or the liquid powders are contacted, is subjected to the hydrophobic treatment, use is made of a substrate in which a surface is subjected to a hexamethyldisilazan treatment; such that prior to the hexamethyldisilazan treatment, OH group adding process is performed; such that a water absorption rate of the particles or the liquid powders sealed between the substrates, which is measured according to ASTM D570 at 23° C. for 24 hours, is not greater than 3%; and such that a volume occupying rate of the particles or the liquid powders sealed between the substrates is in a range of 3-70 vol %.

In the image display panel according to the first aspect of the invention, since at least the surface of the substrate, to which the particles or the liquid powders are contacted, is subjected to the hydrophobic treatment, the particles and the liquid powders are difficult to agglutinate and adhere with respect to the surface of the substrate, and thus a surface state, wherein the particles and the liquid powders are easily moved, can be achieved. As a result, it is possible to obtain the image display panel and the image display device, which are inexpensive and have excellent repetition durability.

According to the second aspect of the invention, an image display panel: in which one or more than two cells surrounded by partition walls are formed between opposed two substrates with a predetermined distance, at least one of two substrates being transparent; in which particles or liquid powders are accommodated in respective cells; and in which the particles or the liquid powders, to which an electrostatic field is applied, are made to move so as to display an image; is characterized in that at least a surface of the partition wall, to which the particles or the liquid powders are contacted, is subjected to a hydrophobic treatment.

In the image display panel according to the second aspect of the invention, since at least the surface of the partition wall, to which the particles or the liquid powders are contacted, is subjected to the hydrophobic treatment, the particles and the liquid powders are difficult to agglutinate and adhere with respect to the surface of the partition wall, and thus a surface state, wherein the particles and the liquid powders are easily moved, can be achieved. As a result, it is possible to obtain the image display panel and the image display device, which are inexpensive and have excellent repetition durability.

As preferred embodiments of the image display panel according to the second aspect of the invention, there are cases: such that the surface of the partition wall, to which the particles or the liquid powders are contacted, is subjected to the hydrophobic treatment using hexamethyldisilazan; and such that prior to the hydrophobic treatment using hexamethyldisilazan, OH group adding process is performed. In both cases, it is possible to perform the present invention effectively.

According to the third aspect of the invention, an image display panel: in which one or more than two cells surrounded by partition walls are formed between opposed two substrates with a predetermined distance, at least one of two substrates being transparent, to which an electrostatic field is applied, are made to move so as to display an image; is characterized in that at least a surface of the partition wall, to which the particles or the liquid powders are contacted, is coated by a material having a small charge decay property.

In the image display panel according to the third aspect of the invention, since at least the surface of the partition wall, to which the particles or the liquid powders are contacted, is coated by a material having a small charge decay property, the particles and the liquid powders are difficult to agglutinate and adhere with respect to the surface of the partition wall, and thus a surface state, wherein the particles and the liquid powders are easily moved, can be achieved. As a result, it is possible to obtain the image display panel and the image display device, which are inexpensive and have excellent repetition durability.

As preferred embodiments of the image display panel according to the third aspect of the invention, there are cases: such that the material having a small charge decay property is a resin including fluorocarbon resin, and, as the fluorocarbon resin, use is made of one or more than two kinds of tetrafluoroethylene-perfluoroalkylvinylether copolymer, tetrafluoroethylene-hexafluoropropylene-perfluoroalkylvinylether copolymer, tetrafluoroethylene-ethylene copolymer, polychlorotrifluoroethylene, chlorotrifluoroethylene-ethylene copolymer, polytetrafluoroethylene, polyfluoride and polyvinylfluoride; and such that the material having a small charge decay property coated to a surface of the partition wall has such a property measured by a charge decay property measuring method using a coating material as a film that the maximum surface potential, in the case that the surface thereof is charged by a generation of Corona discharge caused by applying a voltage of 8 KV to a Corona discharge device deployed at a distance of 1 mm from the surface, is 300 V or greater at 0.3 second after the Corona discharge. In both cases, it is possible to perform the present invention effectively.

According to the fourth aspect of the invention, an image display panel: in which one or more than two cells surrounded by partition walls are formed between opposed two substrates with a predetermined distance, at least one of two substrates being transparent; in which particles or liquid powders are accommodated in respective cells; and in which the particles or the liquid powders, to which an electrostatic field is applied, are made to move so as to display an image; is characterized in that a universal hardness of a binder resin used for a material constituting the partition wall is not less than 400 N/mm$^2$, which is obtained by a method of measuring a universal hardness in which the binder resin constituting the partition wall having a thickness of 3 μm is formed on a glass substrate having a universal hardness of 2000 N/mm$^2$.

In the image display panel according to the fourth aspect of the invention, since the universal hardness of the binder resin used for a material constituting the partition wall is not less than 400 N/mm$^2$, which is obtained by a method of measuring a universal hardness in which the binder resin constituting the partition wall having a thickness of 3 μm is formed on a glass substrate having a universal hardness of 2000 N/mm$^2$, the particles and the liquid powders are difficult to agglutinate and adhere with respect to the surface of the partition wall, and thus a surface state, wherein the particles and the liquid powders are easily moved, can be achieved. As a result, it is possible to obtain the image display panel and the image display device, which are inexpensive and have excellent repetition durability.

As common preferred embodiments of the image display panel according to the second to the fourth aspects of the invention, there are cases: such that a water absorption rate of the particles or the liquid powders sealed between the substrate, which is measured according to ASTM D570 at 23° C. for 24 hours, is not greater than 3%; such that a volume occupying rate of the particles or the liquid powders sealed between the substrates is in a range of 3-70 vol %; and such that the particles or the liquid powders to be accommodated in the cell having different colors and different charge characteristics and having different charge potentials, and the particles or the liquid powders, to which an electrostatic field is applied, are made to move so as to display an image.

According to the fifth aspect of the invention, an image display panel: in which at least one group of particles or liquid powders is sealed respectively in a plurality of cells formed by partition walls between two substrates, at least one of two substrates being transparent; and in which the particles or the liquid powders, to which an electrostatic field is applied, are made to move so as to display an image; is characterized in that a ratio Lh/Lw between a height Lh and a width Lw of the partition wall satisfies $0.5 \leq Lh/Lw \leq 20$.

In the image display panel according to the fifth aspect of the invention, since the ratio Lh/Lw between a height Lh and a width Lw of the partition wall satisfies $0.5 \leq Lh/Lw \leq 20$, it is possible to eliminate the shape of the partition wall in which a minimum opening rate required in an actual use can not be obtained and also eliminate the shape of the partition wall which is difficult to manufacture the partition wall, as is clearly understood from the examples explained below. As a result, it is possible to provide the image display panel, which can maintain both of the opening rate and the manufacturing property.

As a preferred embodiment of the image display panel according to the fifth aspect of the invention, there is a case such that the ratio Lh/Lw between the height Lh and the width Lw satisfies $1 \leq Lh/Lw \leq 10$. In this case, it is possible to provide the image display panel, which has an excellent opening rate and an excellent manufacturing property, as is clearly understood from the examples mentioned below.

According to the sixth aspect of the invention, an image display panel: in which at least one group of particles or liquid powders is sealed respectively in a plurality of cells formed by partition walls between two substrates, at least one of two substrates being transparent; and in which the particles or the liquid powders, to which an electrostatic field is applied, are made to move so as to display an image; is characterized in that the partition wall has a predetermined drying function.

In the image display panel according to the sixth aspect of the invention, since the partition wall has a predetermined drying function, it is possible to control humidity by using the drying function without filling a drying agent in the device. Therefore, it is possible to provide the image display panel in which an atmosphere in the device can be made even without using the drying agent.

As a preferred embodiment of the image display panel according to the sixth aspect of the invention, there is a case such that a water absorption rate S of the partition wall satisfies $0.1\% \leq S \leq 10\%$. In this case, as is clearly understood from the examples mentioned below, it is possible to eliminate the case in which a water absorption effect becomes insufficient and also eliminate the case in which water is excessively absorbed during a device assembly process and a display property is affected, so that the partition wall achieves a predetermined drying function.

Moreover, according to the invention, an image display device is characterized in that the image display panel set forth in the above embodiments.

BRIEF DESCRIPTION OF DRAWINGS

FIGS. 9a and 9b are a cross sectional view and a plan view respectively illustrating the partition wall in the image display panel according to the sixth aspect of the invention.

FIG. 10 is a schematic view depicting one embodiment of the display cell formed by the partition walls.

BEST MODE FOR CARRYING OUT THE INVENTION

In the image display panel according to the first to the sixth aspects of the invention, wherein the particles or the liquid powders are sealed between opposed substrates, an electrostatic field is applied to the particles or the liquid powders by some kind of means. The particles or the liquid powders charged in a low potential are attracted toward a high potential side by means of Coulomb's force and so on, and the particles or the liquid powders are attracted toward a low potential side by means of Coulomb's force and so on. If a direction of the electrostatic field is varied in response to a switching of potentials, the particles or the liquid powders mentioned above perform a reciprocating motion, and thus the image is displayed. Therefore, it is necessary to design the image display panel so as to move the particles or the liquid powders evenly and to maintain a stability when a repetition of the image display is performed or when the image is saved.

Figure 1:
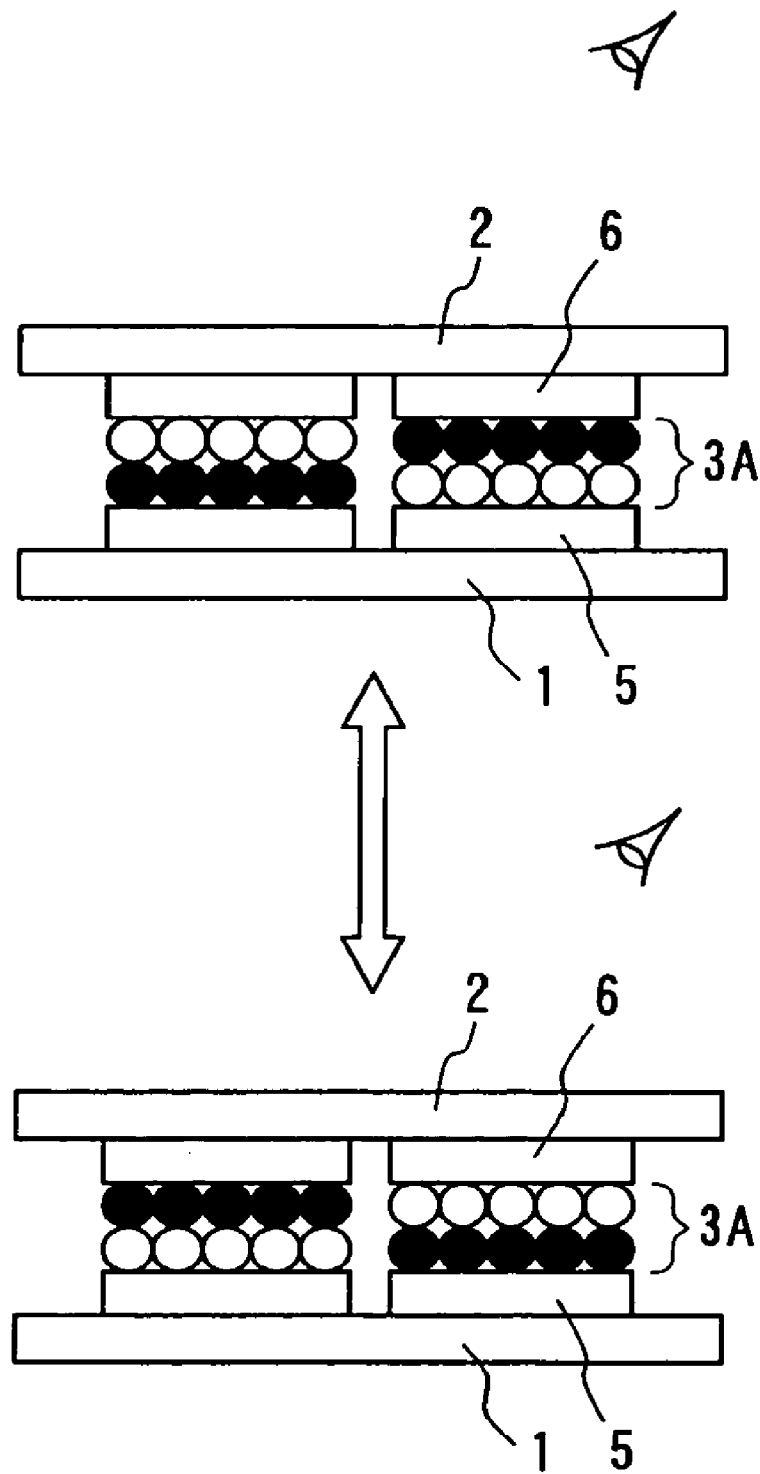
FIG. 1 is a schematic view showing one embodiment of the display method using the particles in the image display panel according to the invention.
Figure 2:
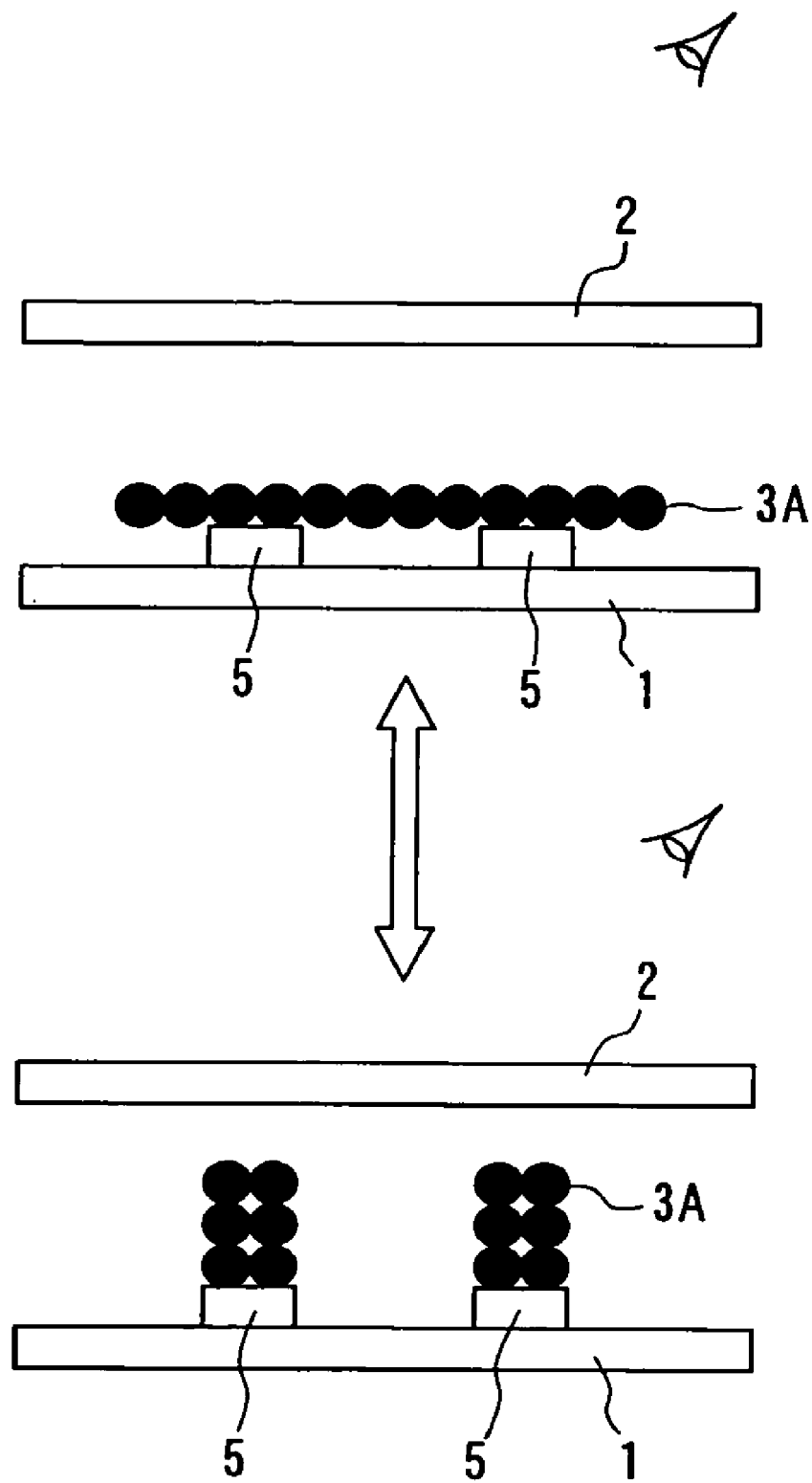
FIG. 2 is a schematic view illustrating another embodiment of the display method using the particles in the image display panel according to the invention.
Figure 3:
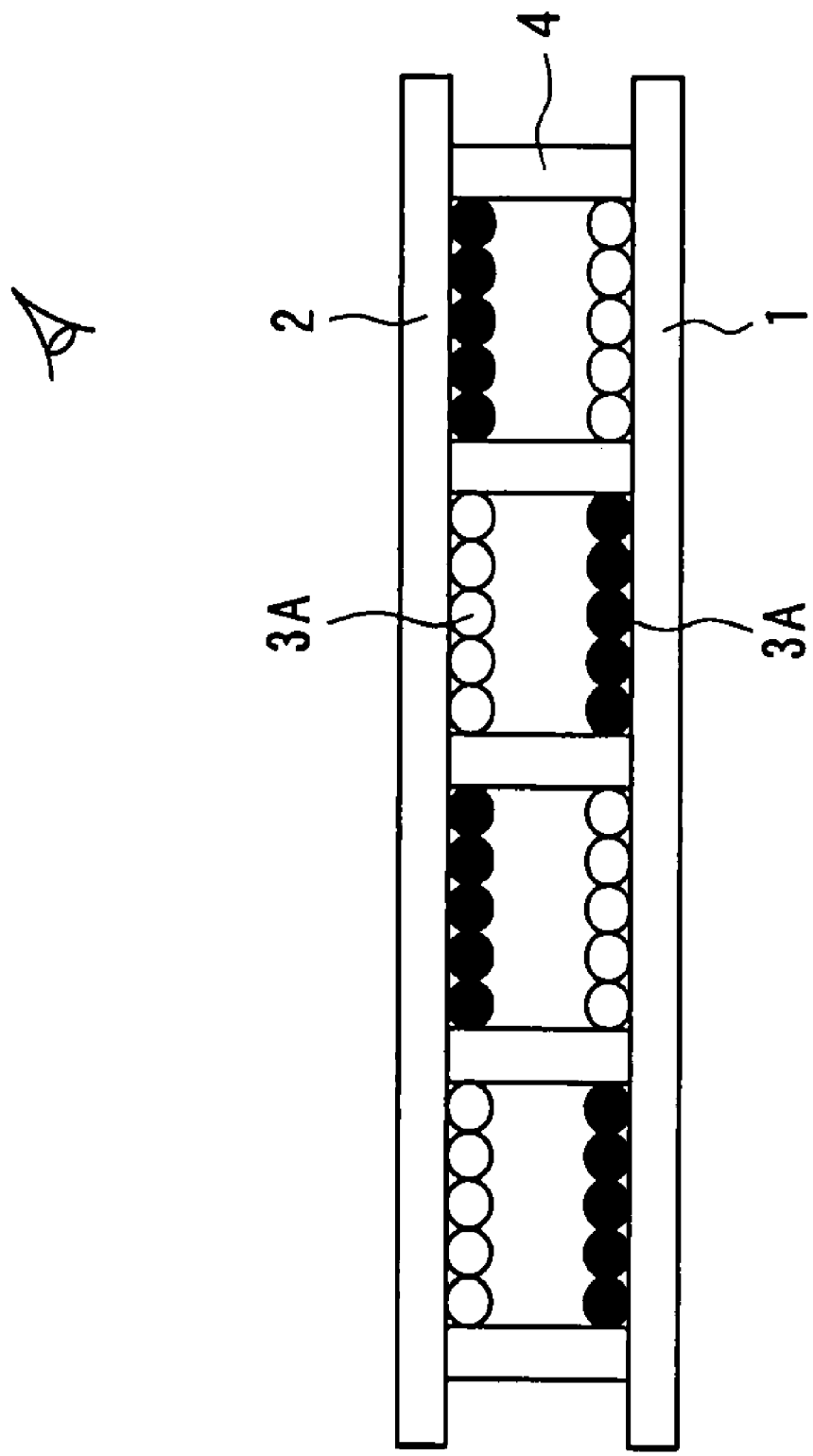
FIG. 3 is a schematic view depicting one embodiment of the panel construction using the particles in the image display panel according to the invention.
Figure 4:
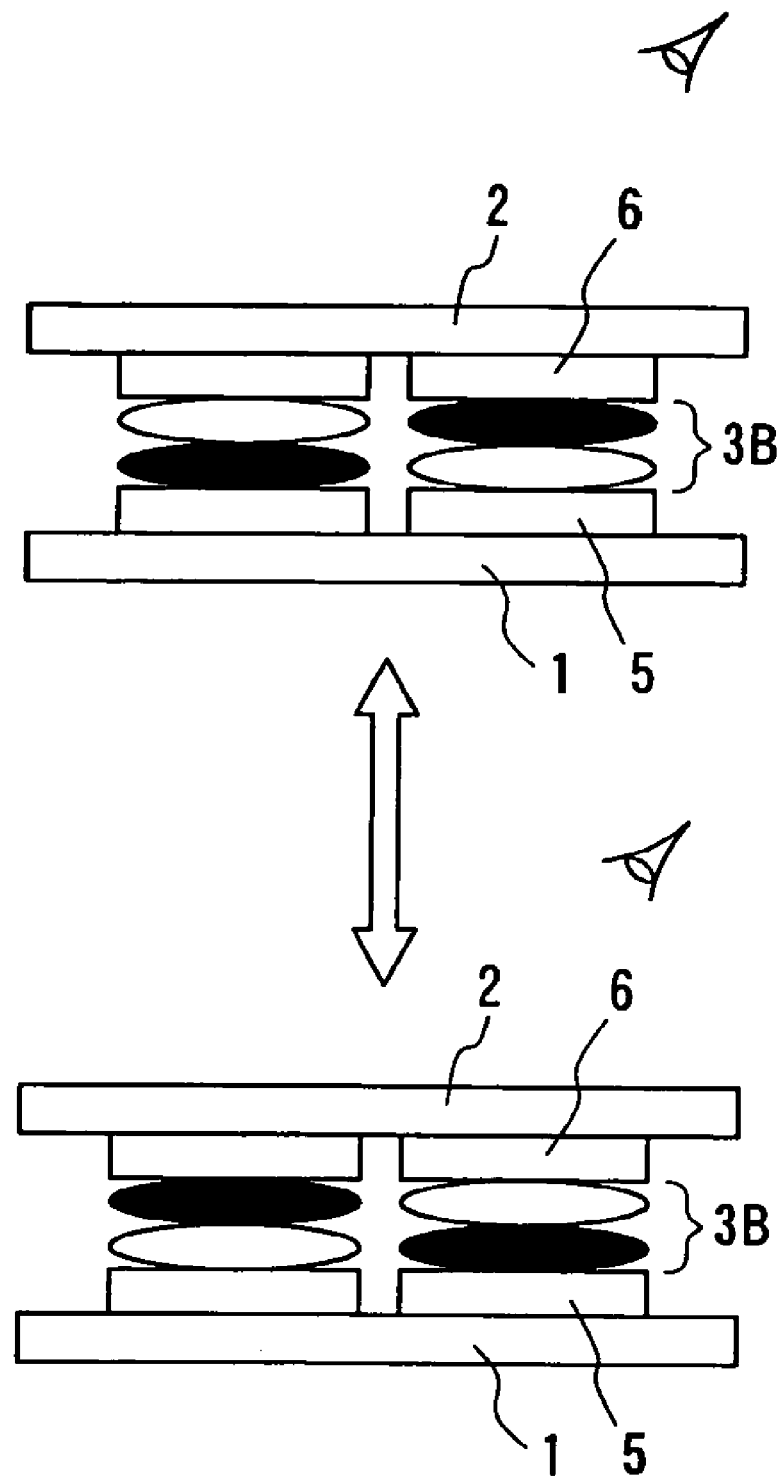
FIG. 4 is a schematic view showing one embodiment of the display method using the liquid powders in the image display panel according to the invention.
Figure 5:
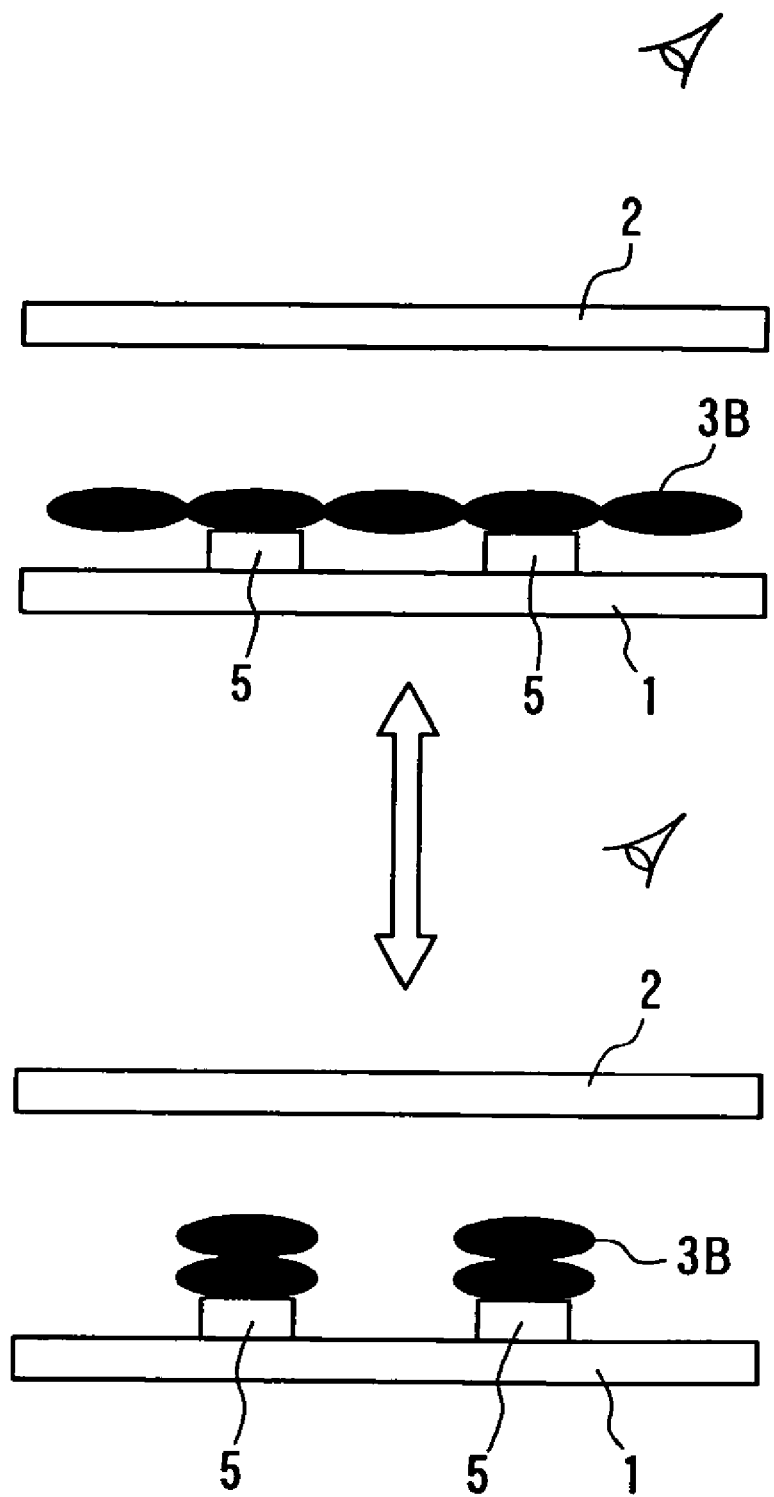
FIG. 5 is a schematic view illustrating another embodiment of the display method using the liquid powders in the image display panel according to the invention.
Figure 6:
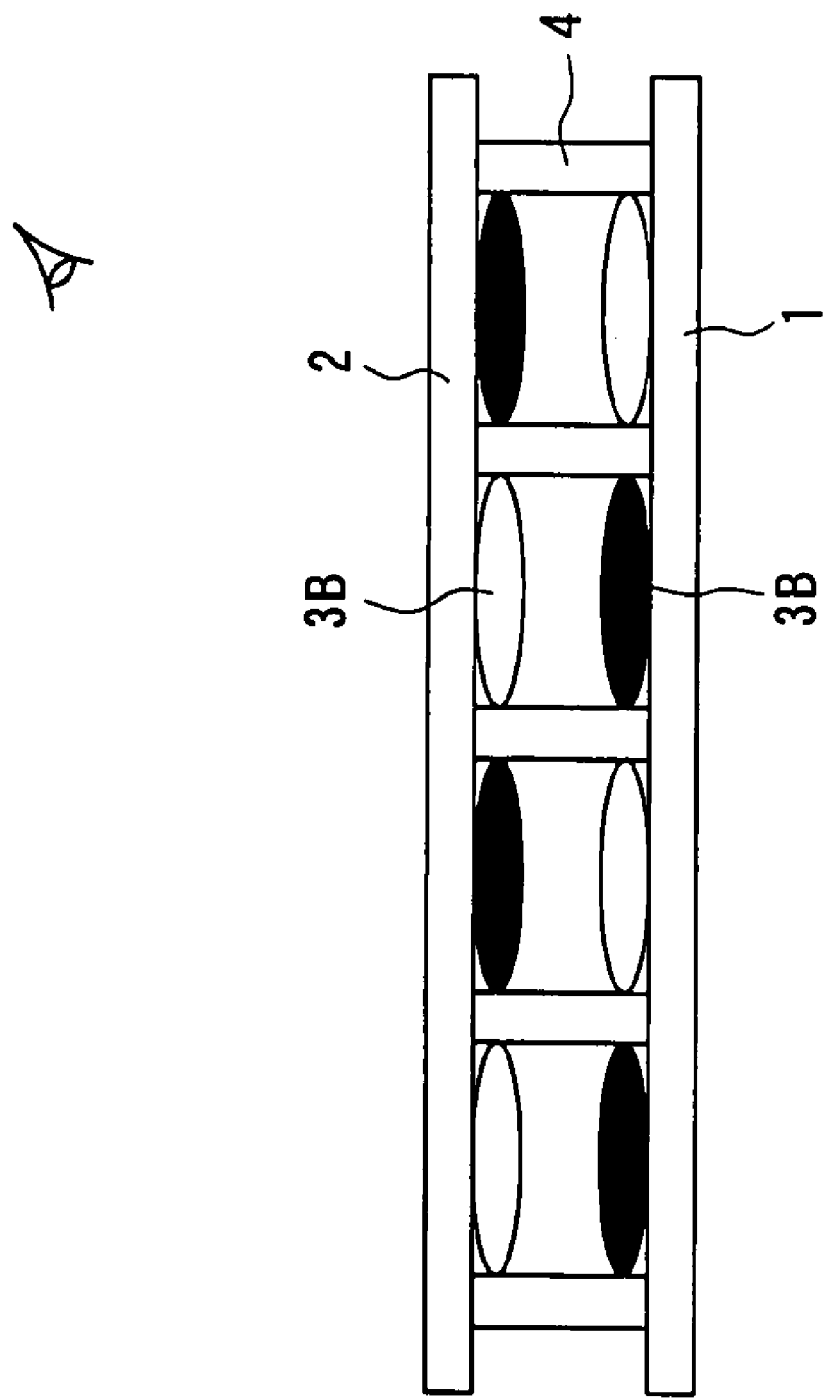
FIG. 6 is a schematic view depicting one embodiment of the panel construction using the liquid powders in the image display panel according to the invention.

The image display panel according to the first to the sixth aspects of the invention can be applied to both of panel having a display type in which two or more groups of particles 3A having different colors (referred to FIG. 1) are moved in a direction perpendicular to substrates 1, 2 and a panel having a display type in which one group of particles 3A having a color (referred to FIG. 2) or liquid powders 3B having a color (referred to FIG. 5) are moved in a direction parallel to the substrates 1, 2. One embodiment of a panel construction for the display is shown in FIG. 3 (using the particles 3A) and FIG. 6 (using the liquid powders 3B). It should be noted that, in FIGS. 1 to 6, a numeral 4 is a partition wall arranged according to need, and numerals 5, 6 are electrodes arranged according to need so as to apply an electrostatic field to the particles 3A and the liquid powders 3B.

Hereinafter, features of the first to the sixth aspects of the invention will be explained respectively. Then, common members of the image display panel will be explained. After that, examples of respective aspects of the invention will be explained.

(As to Features of the First Aspect of the Invention)

A feature of the first aspect of the invention is that, in the image display panel having the construction mentioned above, a hydrophobic treatment using preferably hexamethyldisilazan is performed with respect to a surface of the substrate 1 opposed to the substrate 2 and/or a surface of the substrate 2 opposed to the substrate 1.

In the first aspect of the invention, it is possible to improve durability during a repetition use: by making at least a surface of the substrate, to which the particles or the liquid powders are contacted, in a hydrophobic state; by making a water content of a material constituting the particles or the liquid powders in an adequate range; and by making a filling amount of the particles or the liquid powders in an adequate range.

As a preferred embodiment of a method for making the surface of the substrate in a hydrophobic state, the hexamethyldisilazan treatment is performed with respect to the surface of the substrate. If the surface of the substrate is treated by hexamethyldisilazan so as to make it to the hydrophobic state, the particles and the liquid powders are difficult to agglutinate and adhere with respect to the surface of the substrate, and thus a surface state, wherein the particles and the liquid powders are easily moved, can be achieved. In this case, it is preferred that, since the surface of the substrate becomes in the hydrophobic state by chemically coupling a functional group existing on the surface of the substrate and hexamethyldisilazan as shown in the following formula, an affection to the particles or the liquid powders is minimized.

As the treatment method, use is made of a wet process wherein: the substrate is immersed in a solution of hexamethyldisilazan; hexamethyldisilazan is decomposed by using a centrifugation and so on; and the substrate is heated and dried, and a dry process wherein: hexamethyldisilazan or its solution is introduced on a dried substrate by means of dropping, spraying and so on; and the substrate is heated and dried. An amount of hexamethyldisilazan to be treated with respect to the surface of the substrate is not particularly limited in the present invention, and normally it is sufficient to use a solution in which 0.1-10 weight % of hexamethyldisilazan is included. Moreover, as a prior process of the hexamethyldisilazan treatment, it is preferred to perform OH group adding process. This OH group adding process can be performed by a method such as plasma treatment, NaOH treatment and so on.

As another method for making the surface of the substrate in the hydrophobic state, use is made of a method using another silane coupling agent. Also in this case, the same treatment method as that of hexamethyldisilazan can be utilized. As such another silane coupling agent, use is made of methyltrichlorosilane, dimethyldichlorosilane, trimethylchlorosilane, methyltrimethoxysilane, dimethyldimethoxysilane, methyltriethoxysilane, dimethyldiethoxysilane, isobutyltrimethoxysilane, decyltrimethoxysilane, ter-butyldimethylchlorosilane, vinyltrichlorosilane, vinyltrimethoxysilane, vinyltriethoxysilane and so on.

(As to Features of the Second to the Fourth Aspects of the Invention)

The present invention is achieved by investigating the partition wall 4 formed on the substrate, and has features: such that the particles and the liquid powders becomes difficult to agglutinate and adhere with respect to the surface of the partition wall by making the surface of the partition wall (rib) in the hydrophobic state and a durability as the image display panel is improved (second aspect of the invention); such that the particles and the liquid powders becomes difficult to agglutinate and adhere with respect to the surface of the partition wall by coating the surface of the partition wall (rib) with a material having a small charge decay property and a durability as the image display panel is improved (third aspect of the invention); and such that the particles and the liquid powders becomes difficult to agglutinate and adhere with respect to the surface of the partition wall by making a universal hardness of the binder resin used for a material constituting the partition wall (rib) to not less than 400 N/mm$^2$ and a durability as the image display panel is improved (fourth aspect of the invention).

As a preferred embodiment of a method for making the surface of the partition wall in a hydrophobic state, the hexamethyldisilazan treatment is performed with respect to the surface of the partition wall. If the surface of the partition wall is treated by hexamethyldisilazan so as to make it to the hydrophobic state, the particles and the liquid powders are difficult to agglutinate and adhere with respect to the surface of the substrate, and thus a surface state, wherein the particles and the liquid powders are easily moved, can be achieved. In this case, it is preferred that, since the surface of the partition wall becomes in the hydrophobic state by chemically coupling a functional group existing on the surface of the substrate and hexamethyldisilazan as shown in the following formula, an affection to the particles or the liquid powders is minimized.

As the treatment method, use is made of a wet process wherein: the substrate with the partition wall is immersed in a solution of hexamethyldisilazan; hexamethyldisilazan is decomposed by using a centrifugation and so on; and the substrate with the partition wall is heated and dried, and a dry process wherein: hexamethyldisilazan or its solution is introduced on a dried partition wall by means of dropping, spraying and so on; and the partition wall is heated and dried. An amount of hexamethyldisilazan to be treated with respect to the surface of the partition wall is not particularly limited in the present invention, and normally it is sufficient to use a solution in which 0.1-10 weight % of hexamethyldisilazan is included. Moreover, as a prior process of the hexamethyldisilazan treatment, it is preferred to perform OH group adding process. This OH group adding process can be performed by a method such as plasma treatment, NaOH treatment and so on.

As another method for making the surface of the partition wall in the hydrophobic state, use is made of a method using another silane coupling agent. Also in this case, the same treatment method as that of hexamethyldisilazan can be utilized. As such another silane coupling agent, use is made of methyltrichlorosilane, dimethyldichlorosilane, trimethylchlorosilane, methyltrimethoxysilane, dimethyldimethoxysilane, methyltriethoxysilane, dimethyldiethoxysilane, isobutyltrimethoxysilane, decyltrimethoxysilane, ter-butyldimethylchlorosilane, vinyltrichlorosilane, vinyltrimethoxysilane, vinyltriethoxysilane and so on.

Then, in the image display panel according to the third aspect of the invention, the material having a small charge decay property, which is used for coating the surface of the partition wall, will be explained.

As the material having a small charge decay property, it is specifically important to select a material satisfying the measuring method mentioned below. That is, the material used for coating the surface of the partition wall is made to a film shape having a thickness in a range of 5-100 µm, and a Corona discharge is generated by applying a voltage of 8 KV to a Corona discharger provided at a position having a distance of 1 mm from a surface of the film so as to charge the surface, so that a variation of a surface potential is measured and is determined. In this case, it is important to used the material for coating in which a maximum value of the surface potential is 300 V or greater preferably 400 V or greater at 0.3 second after the Corona discharge.

As the coating material having a small charge decay property, use is made of a resin material including fluorocarbon resin. As the fluorocarbon resin, use is made of one or more than two kinds of fluorocarbon resins selected from a group of tetrafluoroethlene-perfluoroalkylvinylester copolymer, tetrafluoroethylene-hexafluoropropylene-perfluoroalkylvinylester copolymer, tetrafluoro ethylene-ethylene copolymer, polychlorotrifluoroethylene, chlorotrifluoro ethylene-ethylene copolymer, polytetrafluoroethylene, polyfluoride and polycinylfluoride.

As a material having a small charge decay property for coating the partition wall, it is preferred to blend another resins with fluorocarbon resins mentioned above. In this case, it is preferred that an amount of fluorocarbon resins is at least not less that 60 weight %, and preferably not less than 80 weight %.

Figure 7:
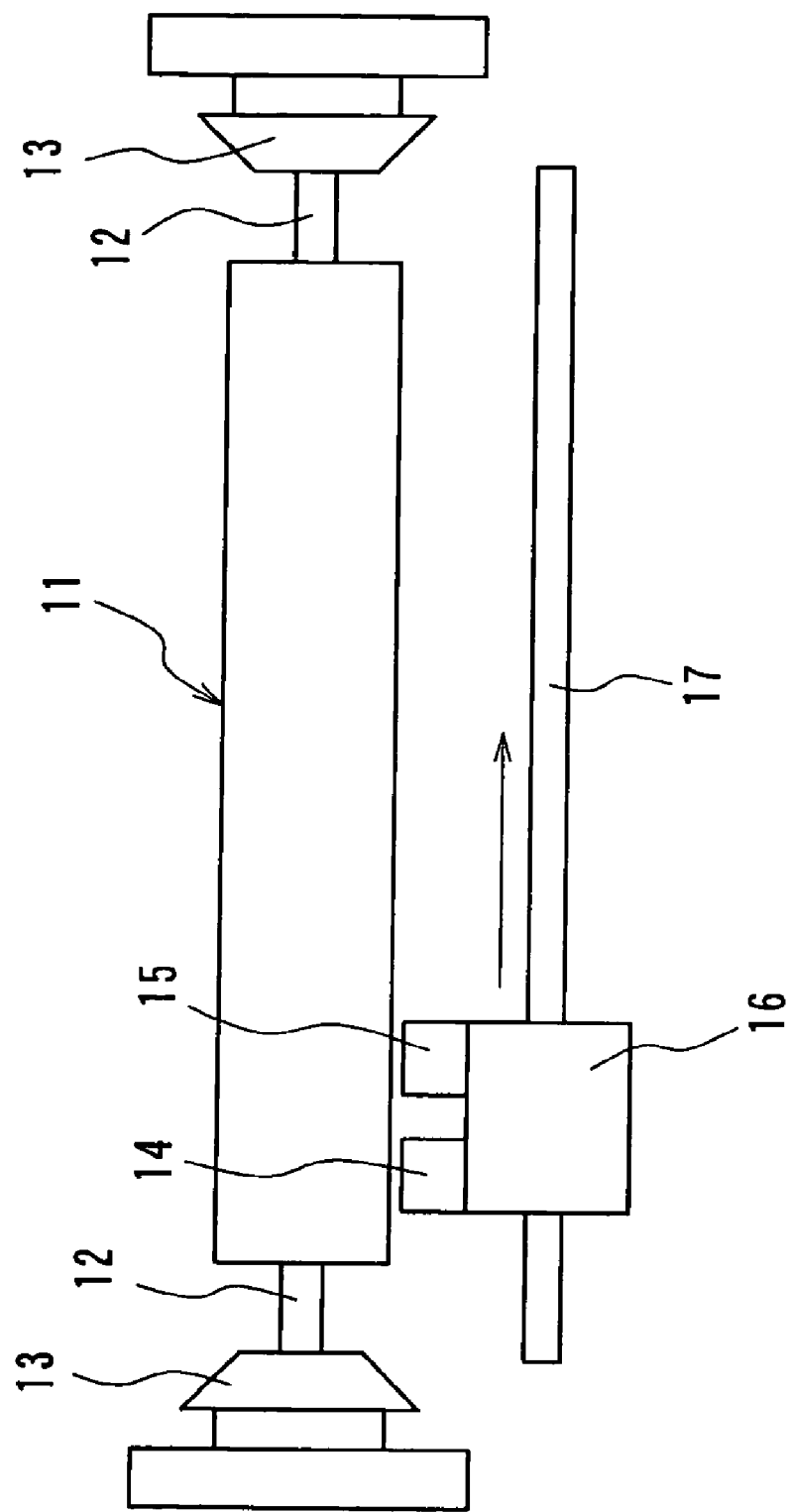
FIG. 7 is a schematic view showing one embodiment of the apparatus for measuring the surface potential.

In this case, the foregoing surface potential is measured by means of an apparatus (CRT2000 produced by QEA Inc.) disclosed in a specification and drawings of Pat. No. 22,003. FIG. 7 is a schematic view showing one embodiment of the apparatus for measuring the surface potential. In the apparatus shown in FIG. 7, shaft portions 12 of a roll member 11, on which a coating resin is arranged, are supported by chucks 13, and, a measurement unit 16, in which a compact scorotoron discharger 14 and a surface potential meter 15 are provided with a distance of 1 mm from a surface of the roll member 11.

When the measurement is performed, the measurement unit 16 is moved from one end to the other end of the roll member 11 along a rail 17 with a uniform speed, while the roll member 11 remains stationary, and its surface potential is measured while charging a surface of the roll member 11. Moreover, a measurement environment should be settled at a temperature of 25±3° C. and a humidity of 55±5%.

A thickness of the coating material is preferably 0.01-100 µm, and more preferably 0.1-30 µm. Moreover, as a coating method, use is made of a printing method, a dipping method, an electrostatic coating method, a sputtering method and so on, but it is not limited. Further, the substrate may be coated together with the partition wall.

As for a solvent insoluble rate of the resin material used for coating, it is preferred that a solvent insoluble rate of the resin, which is defined by the following formula, is not less than 50%, and more preferably not less than 70%:

$$\text{solvent insoluble rate } (\%) = (B/A) \times 100;$$

(here, A is a weight of the resin before being immersed into the solvent and B is a weight of the resin components after the resin is immersed into good solvent at 25° C. for 24 hours).

If the solvent insoluble rate is less than 50%, a bleed is generated on a surface of the partition wall when maintaining for a long time. In this case, it affects an adhesion power with the particles or the liquid powders and prevents a movement of the particles or the liquid powders. Therefore, there is a case such that it affects a durability of the image display. Here, as a solvent for measuring the solvent insoluble rate, it is preferred to use fluorocarbon resin such as methylethylketone and so on, polyamide resin such as methanol and so on, acrylic urethane resin such as methylethylketone, toluene and so on, melamine resin such as acetone, isopropanol and so on, and, silicone resin such as toluene and so on.

(As to a Feature of the Fifth Aspect of the Invention)

Figure 8:
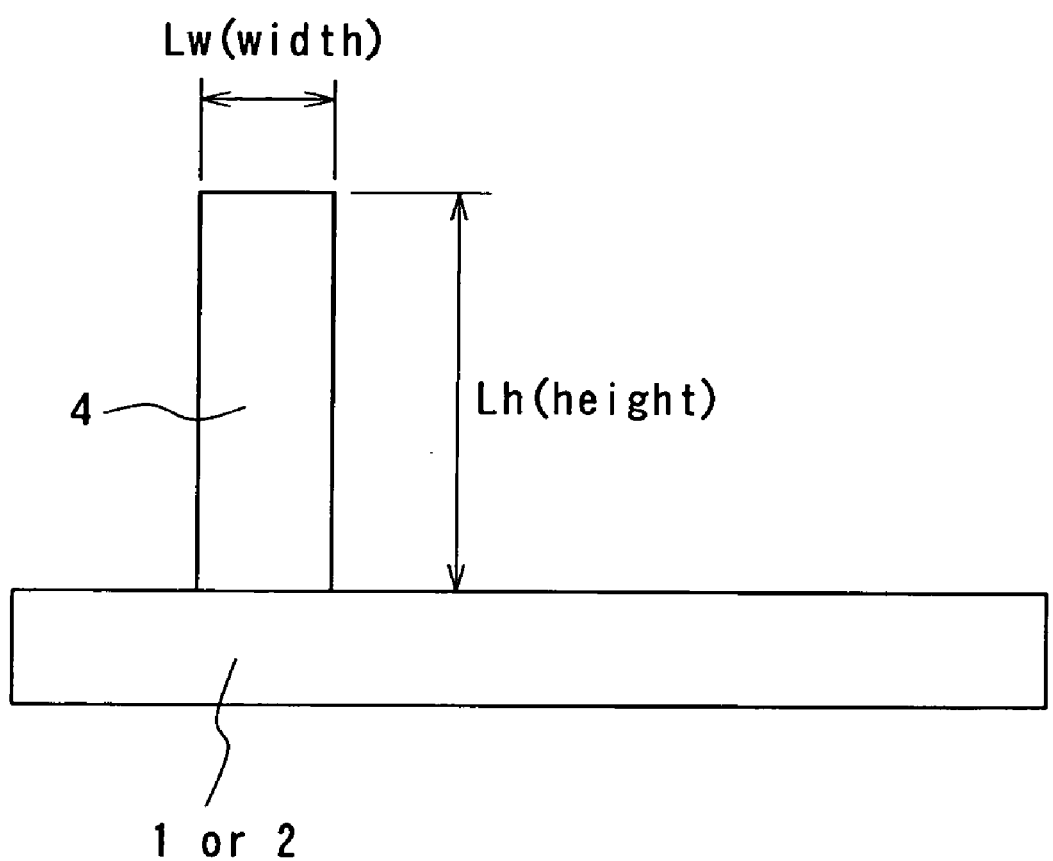
FIG. 8 is schematic view explaining the features on a cross sectional shape of the partition wall in the image display panel according to the fifth aspect of the invention.

Then, a shape of the partition wall 4, which is the feature of the image display device according to the fifth aspect of the invention, will be explained with reference to FIG. 8. FIG. 8 is a schematic view explaining the features on a cross sectional shape of the partition wall in the image display panel according to the fifth aspect of the invention. In FIG. 8, when it is assumed that a height of the partition wall 4 formed on the substrate 1 or 2 is Lh and a width of the partition wall 4 is Lw, a ratio Lh/Lw is set at a value within an adequate range shown in the following formula (1) and is preferably set at a value within an adequate range shown in the following formula (2):

$$0.5 \leq Lh/Lw \leq 20 \tag{1}$$

$$1 \leq Lh/Lw \leq 10 \tag{2}$$

In this embodiment, since the ratio Lh/Lw between the height and the width of the partition wall 4 is set in the adequate range shown in the formula (1), it is possible to provide the image display panel, which has an excellent opening rate and an excellent manufacturing property.

(As to a Feature of the Sixth Aspect of the Invention)

Then, the partition wall 4, which is the feature of the image display device according to the sixth aspect of the invention, will be explained with reference to FIGS. 9a and 9b. FIGS. 9a and 9b are a cross sectional view and a plan view, respectively, showing the partition wall in the image display panel according to the sixth aspect of the invention. On the substrate 1 or 2 shown in FIG. 9a, a plurality of partition walls 4 are formed. These plural partition walls 4 have a square shape with a grid arrangement as shown in FIG. 9b or have various shapes with a honeycomb arrangement as shown in FIG. 10. In the present invention, as the partition wall 5, use is made of the partition wall having a predetermined drying function. Specifically, use is made of the partition wall 4 having a water absorption rate S within an adequate range shown in the following formula (3):

$$0.1\% \leq S \leq 10\% \tag{3}$$

In this embodiment, since the water absorption rate S of the partition wall 4 is set in the adequate range shown in the formula (3), it is possible to make even an atmosphere in the image display device without using a drying agent.

Hereinafter, as to respective construction members of the image display panel according to the invention, particles, liquid powders and common construction members of the first to the sixth aspects of the invention will be explained in detail in this order.

At first, the particles used in the first aspect to the sixth aspects of the invention will be explained.

The particles may be formed by mixing necessary resin, charge control agent, coloring agent, additive and so on and grinding them, or, by polymerizing from monomer, or, by coating a particle with resin, charge control agent, coloring agent, and additive and so on. Hereinafter, typical examples of resin, charge control agent, coloring agent, additive and so on constituting the particles will be explained.

Typical examples of the resin include urethane resin, acrylic resin, polyester resin, acryl urethane resin, silicone resin, nylon resin, epoxy resin, styrene resin, butyral resin, vinylidene chloride resin, melamine resin, phenolic resin, fluorocarbon polymers, and it is possible to combine two or more resins. For the purpose of controlling the attaching force with the substrate, polyester resin, acryl urethane resin, acryl urethane silicone resin, acryl urethane fluorocarbon polymers, urethane resin, fluorocarbon polymers are preferred.

Examples of the electric charge control agent include, positive charge control agent including the fourth grade ammonium salt compound, nigrosine dye, triphenylmethane compound, imidazole derivatives, and so on, and negative charge control agent such as metal containing azo dye, salicylic acid metal complex, nitroimidazole derivative and so on.

As for a coloring agent, various kinds of basic or acidic dye may be employable. Examples include Nigrosine, Methylene Blue, quinoline yellow, rose bengal and so on.

Examples of the inorganic additives include titanium oxide, Chinese white, zinc sulfide, antimonial oxide, calcium carbonate, zinc white, talc, silica, calcium silicate, alumina white, cadmium yellow, cadmium red, cadmium orange, titanium yellow, iron blue, ultramarine blue, cobalt blue, cobalt green, cobalt violet, ferric oxide, carbon black, copper powder, aluminum powder and so on.

Here, in order to further improve a repeating durability, it is effective to control stability of the resin constituting the particles, especially, a water absorbing rate and a solvent insoluble rate. It is preferred that the water absorbing rate of the resin constituting the particles sealed between the substrates is not more than 3 wt %, and preferably not more than 2 wt %. In this case, a measurement of water absorbing rate is performed according to ASTM-D570 and a measuring condition is 23° C. for 24 hours.

As for the solvent insoluble rate of the particles, it is preferred that a solvent insoluble rate of the particles, which is defined by the following formula, is not less than 50%, and more preferably not less than 70%:

solvent insoluble rate (%)=$(B/A) \times 100$;

(here, A is a weight of the resin before being immersed into the solvent and B is a weight of resin components after the resin is immersed into good solvent at 25° C. for 24 hours).

If the solvent insoluble rate is less than 50%, a bleed is generated on a surface of the particle when maintaining for a long time. In this case, it affects an adhesion power with the particles and prevents a movement of the particles. Therefore, there is a case such that it affects a durability of the image display.

Here, as a solvent (good solvent) for measuring the solvent insoluble rate, it is preferred to use fluoroplastic such as methyl ethyl ketone and so on, polyamide resin such as methanol and so on, acrylic urethane resin such as methyl ethyl ketone, toluene and so on, melamine resin such as acetone, isopropanol and so on, silicone resin such as toluene and so on.

Moreover, it is preferred that the particles have a circular shape. In the present invention, it is preferred that particle diameter distribution Span of respective particles, which is defined by the following formula, is not more than 5 preferably not more than 3:

Span=$(d(0.9)-d(0.1))/d(0.5)$;

(here, d(0.5) means a value of the particle diameter expressed by μm wherein an amount of the particles having the particle diameter larger than this value is 50% and an amount of the particles having the particle diameter expressed by μm wherein an amount of the particles having a particle diameter smaller than this value is 10%, and d(0.9) means a value of the particle diameter expressed by μm wherein an amount of the particles having the particle diameter smaller than this value is 90%). If the particle diameter distribution Span of the particles is set to not more than 5, the particle diameter becomes even and it is possible to perform an even particle movement.

Further, it is preferred that the average particle diameter d(0.5) of the particles is 0.1-50 μm. If the average particle diameter exceeds this range, display sharpness is deteriorated, and if the average particle diameter is less than this range, a particle movement is not preferably performed due to an excess agglutination force between the particles.

Furthermore, as to a relation between the particles, it is important to control a ratio of d(0.5) of the particles having a minimum diameter with respect to d(0.5) of the particles having a maximum diameter to not larger than 50, and preferably not larger than 10.

If the particle diameter distribution Span is made smaller, the particles having different charge characteristic with each other are moved in opposite directions. Therefore, it is preferred that diameters of the particles are substantially same and the same amounts of the particles are moved in the opposite directions easily, so that this range is determined.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution. In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

Then, the liquid powders used in the first to the sixth aspects of the invention will be explained.

In the present invention, a term "liquid powder" means an intermediate material having both liquid properties and particle properties and exhibiting a self-fluidity without utilizing gas force and liquid force. Preferably, it is a material having an excellent fluidity such that there is no repose angle defining a fluidity of powder. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid (Heibonsha Ltd.: encyclopedia). In the present invention, it is found that the intermediate material having both fluid properties and solid properties and exhibiting a self-fluidity without utilizing gas force and liquid force can be produced specifically, and this is defined as the liquid powder.

That is, as is the same as the definition of the liquid crystal (intermediate phase between a liquid and a solid), the liquid powder according to the invention is a material showing the intermediate state having both liquid properties and particle properties, which is extremely difficult to receive an influence of the gravity showing the particle properties mentioned above and indicates a high fluidity. Such a material can be obtained in an aerosol state, i.e., in a dispersion system wherein a solid-like or a liquid-like material is floating in a relatively stable manner as a dispersant in a gas, and thus, in the image display device according to the invention, a solid material is used as a dispersant.

The image display panel which is a target of the present invention has a construction such that the liquid powders composed of a solid material stably floating as a dispersoid in a gas and exhibiting a high fluidity in an aerosol state are sealed between opposed two substrates, wherein one of two substrates is transparent. Such liquid powders can be made to move easily and stably by means of Coulomb's force and so on generated by applying a low voltage.

As mentioned above, the liquid powders means an intermediate material having both liquid properties and particle properties and exhibiting a self-fluidity without utilizing gas force and liquid force. Such liquid powders become particularly an aerosol state. In the image display device according to the invention, the liquid powders used in a state such that a solid material is relatively and stably floating as a dispersoid in a gas.

As the aerosol state, it is preferred that an apparent volume in a maximum floating state is two times or more than that in a non-floating state, more preferably 2.5 times or more than that in the non-floating state, and most preferably three times or more than that in non-floating state. In this case, an upper limit is not defined, but it is preferred that an apparent volume is 12 times or smaller than that in the non-floating state.

If the apparent volume in the maximum floating state is smaller than two times, a display controlling becomes difficult. On the other hand, if the apparent volume in the maximum floating state is larger than 12 times, a handling inconvenience during a liquid powder filling operation into the device such as a particle over-scattering occurs. That is, it is measured by filling the liquid powders in a transparent closed vessel through which the liquid powders are seen; vibrating or dropping the vessel itself to obtain a maximum floating state; and measuring an apparent volume at that time from outside of the vessel. Specifically, the liquid powder having a volume ⅕ of the vessel is filled as the liquid powder in a polypropylene vessel with a cap, having a diameter (inner diameter) of 6 cm and a height of 10 cm (product name I-boy® produced by As-one Co., Ltd.), the vessel is set in the vibrator, and a vibration wherein a distance of 6 cm is repeated at a speed of 3 reciprocating/sec. is performed for 3 hours. Then, the apparent volume in the maximum floating state is obtained from an apparent volume just after a vibration stop.

Moreover, in the image display panel according to the invention, it is preferred that a time change of the apparent volume of the liquid powders satisfies the following formula:

$$V_{10}/V_5 > 0.8;$$

here, $V_5$ indicates the apparent volume (cm$^3$) of the liquid powders after 5 minutes from the maximum floating state; and $V_{10}$ indicates the apparent volume (cm$^3$) of the liquid powder after 10 minutes from the maximum floating state. In this case, in the image display panel according to the invention, it is preferred to set the time change $V_{10}/V_5$ of the apparent volume of the liquid powders to larger than 0.85, more preferably larger than 0.9, most preferably larger than 0.95. If the time change $V_{10}/V_5$ is not larger than 0.8, the liquid powders are substantially equal to normal particles, and thus it is not possible to maintain a high speed response and durability according to the invention.

Moreover, it is preferred that the average particle diameter d(0.5) of the particle materials constituting the liquid powders is 0.1-20 μm, more preferably 0.5-15 μm, most preferably 0.9-8 μm. If the average particle diameter d(0.5) is less than 0.1 μm, a display controlling becomes difficult. On the other hand, if the average particle diameter d(0.5) is larger than 20 μm, a display is possible, but opacifying power is decreased and thus a thin shape device is difficult. Here, the average particle diameter d(0.5) of the particle materials constituting the liquid powder is equal to d(0.5) in the following particle diameter distribution Span.

It is preferred that particle diameter distribution Span of the particle material constituting the liquid powder, which is defined by the following formula, is not more than 5 preferably not more than 3:

$$\text{Particle diameter distribution: Span} = (d(0.9) - d(0.1))/d(0.5);$$

here, d(0.5) means a value of the particle diameter expressed by μm wherein an amount of the particle material constituting the liquid powder having the particle diameter larger than this value is 50% and an amount of the particle material constituting the liquid powder having the particle diameter expressed by μm wherein an amount of the particle material constituting the liquid powder having a particle diameter smaller than this value is 10%, and d(0.9) means a value of the particle diameter expressed by μm wherein an amount of the particle material constituting the liquid powder having the particle diameter smaller than this value is 90%. If the particle diameter distribution Span of the particle materials constituting the liquid powder is set to not more than 5, the particle diameter becomes even and it is possible to perform an even liquid powder movement.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution. In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

The liquid powder may be formed by mixing necessary resin, charge control agent, coloring agent, additive and so on and grinding them, or, by polymerizing from monomer, or, by coating a particle with resin, charge control agent, coloring agent, and additive and so on. Hereinafter, typical examples of resin, charge control agent, coloring agent, additive and so on constituting the liquid powder will be explained.

Typical examples of the resin include urethane resin, acrylic resin, polyester resin, acryl urethane resin, silicone resin, nylon resin, epoxy resin, styrene resin, butyral resin, vinylidene chloride resin, melamine resin, phenolic resin, fluorocarbon polymers, and it is possible to combine two or more resins. For the purpose of controlling the attaching force with the substrate, acryl urethane resin, acryl urethane silicone resin, acryl urethane fluorocarbon polymers, urethane resin, fluorocarbon polymers are preferred.

Examples of the electric charge control agent include, positive charge control agent including the fourth grade ammonium salt compound, nigrosine dye, triphenylmethane compound, imidazole derivatives, and so on, and negative charge control agent such as metal containing azo dye, salicylic acid metal complex, nitroimidazole derivative and so on.

As for a coloring agent, various kinds of basic or acidic dye may be employable. Examples include Nigrosine, Methylene Blue, quinoline yellow, rose bengal and so on.

Examples of the inorganic additives include titanium oxide, Chinese white, zinc sulfide, antimonial oxide, calcium carbonate, zinc white, talc, silica, calcium silicate, alumina white, cadmium yellow, cadmium red, cadmium orange, titanium yellow, iron blue, ultramarine blue, cobalt blue, cobalt green, cobalt violet, ferric oxide, carbon black, copper powder, aluminum powder and so on.

However, if the above materials are only mixed or coated with no contrivance, the liquid powder exhibiting an aerosol state cannot be obtained. The regular method of forming the liquid powder exhibiting an aerosol state is not defined, but the following method is preferably used.

At first, inorganic fine particles having an average particle size of 20-100 nm preferably 20-80 nm are preferably fixed on a surface of materials constituting the liquid powder. Moreover, it is preferred to treat the inorganic fine particles by a silicone oil. Here, as for the inorganic fine particles, use may be made of silicon dioxide (silica), zinc oxide, aluminum oxide, magnesium oxide, cerium oxide, ferric oxide, copper oxide and so on. In this case, a method of fixing the inorganic fine particles is important. For example, use may be made of hybridizer (Nara Machinery Co., Ltd.) or mechano-fusion (Hosokawa Micron Co., Ltd.), and the liquid powders showing an aerosol state are formed under a predetermined condition (for example processing time).

Here, in order to further improve a repeating durability, it is effective to control a stability of the resin constituting the liquid powders, especially, a water absorbing rate and a solvent insoluble rate. It is preferred that the water absorbing rate of the resin constituting the liquid powders sealed between the substrates is not more than 3 wt % especially not more than 2 wt %. In this case, a measurement of the water absorbing rate is performed according to ASTM-D570 and a measuring condition is 23° C. for 24 hours. As for the solvent insoluble rate of the resin constituting the liquid powders, it is preferred that a solvent insoluble rate of the liquid powders, which is defined by the following formula, is not less than 50% more preferably not less than 70%:

$$\text{solvent insoluble rate (\%)}=(B/A)\times 100;$$

(here, A is a weight of the resin before being immersed into the solvent and B is a weight after the resin is immersed into good solvent at 25° C. for 24 hours).

If the solvent insoluble rate is less than 50%, a bleed is generated on a surface of the particle material constituting the liquid powders when maintaining for a long time. In this case, it affects an adhesion power with the liquid powders and prevents a movement of the liquid powders. Therefore, there is a case such that it affects a durability of the image display. Here, as a solvent (good solvent) for measuring the solvent insoluble rate, it is preferred to use fluoroplastic such as methyl ethyl ketone and so on, polyamide resin such as methanol and so on, acrylic urethane resin such as methyl ethyl ketone, toluene and so on, melamine resin such as acetone, isopropanol and so on, silicone resin such as toluene and so on.

As for a filling amount of the particles or the liquid powders, it is preferred to control an occupied volume (volume occupied rate) of the particles or the liquid powders to 3-70 vol %, more preferably 5-60 vol %, most preferably 5-55 vol % of a space between the opposed substrates. If the volume occupied rate of the particles or the liquid powders is less than 3 vol %, a clear image display is not performed, and if it exceeds 70 vol %, the particles or the liquid powders become difficult to move. Here, a space volume means a volume capable of filling particles or the liquid powders obtained by substituting an occupied portion of the partition wall 4 and a seal portion of the device from a space between the opposed substrates 1 and 2.

Then, the substrate will be explained. At least one of the substrates 1 and 2 is the transparent substrate through which a color of the particles can be observed from outside of the device, and it is preferred to use a material having a high transmission factor of visible light and an excellent heat resistance. Whether a flexibility of the substrate is necessary or not is suitably selected in accordance with its use. For example, it is preferred to use a material having flexibility for the use of electronic paper and so on, and it is preferred to use a material having no flexibility for the use of a display of portable device such as mobile phone, PDA, laptop computer and so on.

Examples of the substrate material include polymer sheets such as polyethylene terephthalate, polyether sulfone, polyethylene, polycarbonate, polyimide or acryl and inorganic sheets such as glass, quartz or so. The thickness of the substrate is preferably 2 to 5000 μm, more preferably 5 to 1000 μm. When the thickness is too thin, it becomes difficult to maintain strength and distance uniformity between the substrates, and when the thickness is too thick, vividness and contrast as a display capability degrade, and in particular, flexibility in the case of using for an electronic paper deteriorates.

With respect to the substrate, an electrode may be arranged according to need. In the case of arranging no electrode on the substrate, the particles or the liquid powders charged in a predetermined characteristic and having a color is pulled in or rebounds with respect to the substrate by means of an electric field generated by applying an electrostatic latent image on an outer surface of the substrate. Then, the particles or the liquid powders aligned in accordance with the electrostatic latent image are observed from outside of the display device through the transparent substrate. In this case, the electrostatic latent image mentioned above can be generated for example by a method wherein an electrostatic latent image generated in a known electro-photography system using an electro-photography photo-conductor is transferred and formed on the substrate of the image display device according to the invention, or, by a method wherein an electrostatic latent image is directly formed on the substrate by an ion flow.

In the case of arranging an electrode on the substrate, the particles or the liquid powders charged in a predetermined characteristic and having a color is pulled in or rebounds with respect to the substrate by means of an electric field generated on respective electrodes formed on the substrate by applying an outer voltage thereto. Then, the particles or the liquid powders aligned in accordance with the electrostatic latent image are observed from outside of the display device through the transparent substrate.

With respect to the electrode arranged to the transparent substrate, the electrode is formed of electro-conductive materials, which are transparent and having pattern formation capability. As such electro-conductive materials, indium oxide, metals such as aluminum, or conductive polymer such as polyaniline, polypyrrole and polythiophene formed by vacuum vapor deposition method, coating method, and so on may be employed. It is not necessary to use the transparent electrode arranged on the substrate where no transparency is necessary. Additionally, the thickness of the electrode may be suitable unless the electro-conductivity is absent or any hindrance exists in optical transparency, and it is preferable to be 3 to 1000 nm, and more preferable to be 5 to 400 nm. In this case, the applied outer voltage may be superimposed with a direct current or an alternate current. In the case such that the electrode is exposed to an outermost surface of the substrate, to which the particles or the liquid powders are contacted, it is preferred that the hydrophobic treatment is performed to the electrode surface together with the substrate surface.

Then, the partition wall will be explained. A shape of the partition wall is suitably designed in accordance with a size of the particles or the liquid powders to be used for the display and is not restricted. However, it is preferred to set a width of the partition wall to 2-100 μm more preferably 3-50 μm and to set a height of the partition wall to 10-5000 μm more preferably 10-500 μm.

Moreover, as a method of forming the partition wall, use may be made of a double rib method wherein ribs are formed on the opposed substrates respectively and they are connected with each other and a single rib method wherein a rib is formed on one of the opposed substrates only. In the image display panel according to the invention, both methods can be preferably applied.

The display cell formed by the partition walls each made of rib has a square shape, a triangular shape, a line shape, a circular shape and a hexagon shape, and has an arrangement such as a grid and a honeycomb, as shown in FIG. 10 viewed from a plane surface of the substrate. The formation method of the partition wall is not particularly restricted, however, a screen-printing method, a sandblast method, a photolithography method and an additive method. Among them, it is preferred to use a photolithography method using a resist film.

Then, the first to the sixth aspects of the invention will be respectively explained further specifically with reference to examples and comparative examples. However, the present invention is not limited to the examples mentioned below.

(1) Experiments According to the First Aspect of the Invention:

As for the particles, the liquid powders and the display panels obtained according to the examples and the comparative examples, estimations were performed in accordance with the standards mentioned below.

(Water Absorption Amount of the Particles)

The water absorption amounts of the particles and the liquid powders were measured by using Karl Fischer apparatus.

(Estimation of Display Functions)

Black color display and white color display were repeated by inversing a potential of 250V applied to the display device installed in the display panel manufactured. The estimation of the display function was performed in such a manner that contrast ratios at initial point, after 10000 times repetition, and after 5 days left, were measured by using a reflection image densitometer. Here, the contrast ratio was defined by contrast ratio=reflection density at black display/reflection density of white display. For reference, a maintaining rate was defined as a ratio of the contrast ratio after 10000 times repetition or after 5 days left with respect to the initial contrast ratio.

EXAMPLE 1 (PARTICLES)

The image display panel was manufactured as follows.

At first, a substrate (7 cm×7 cm□) with an electrode was prepared, and on the substrate, a rib having a height of 400 μm was produced to form a partition wall having a stripe shape.

The production of the rib was performed as follows. As an inorganic powder, a glass powder was prepared by melting, cooling and grinding a mixture of $SiO_2$, $Al_2O_3$, $B_2O_3$, $Bi_2O_3$, and ZnO. As a resin, epoxy resin having a heat hardening property was prepared. Then, the glass powder and the epoxy resin were mixed with a solvent and controlled to be a viscosity of 12000 cps, so that a paste was produced. Then, the paste was applied on the substrate and heated at 150° C. to be hardened. By repeating the above paste applying and heating steps, a thickness (corresponding to a height of the partition wall) was controlled to be 400 μm. Then, a dry photo-resist was adhered. With respect to the adhered dry photo-resist, an exposing step and an etching step were performed so as to form a mask by which a partition wall pattern having a line of 50 μm, a space of 400 μm and a pitch of 450 μm can be formed. Then, unnecessary portions were removed by sand-blasting to form a predetermined partition wall having a stripe shape. In this manner, a cell between the partition walls was formed on the substrate.

With respect to the surface of the substrate with the rib, to which the particles were contacted, OH group adding process was performed by means of plasma treatment as a pre-treatment, and then 2 g of hexamethyldisilazan was dropped thereon and it was dried, so that an opposed substrate, to which the surface treatment was performed, was manufactured. Moreover, with respect to the one surface of a glass substrate, to which indium oxide electrode having a thickness of about 500 Å was arranged, OH group adding process was performed by means of plasma treatment as a pre-treatment, and then 2 g of hexamethyldisilazan was dropped thereon and it was dried, so that a transparent substrate, to which the surface treatment was performed, was manufactured.

Then, two kinds of the particles (particles A, particles B) were prepared.

The particles A were produced in such a manner that acrylic urethane resin: EAU53B (Asia Industry Co., Ltd.)/IPDI cross-linking agent: Excel-Hardener HX (Asia Industry Co., Ltd.), CB (Carbon Black) 4 phr, charge control agent: BontronN07 (Orient Chemical Industries Ltd.) 2 phr were added, mixed, ground and classified by a jet-mill. The thus produced particles A were black color particles having a water absorbing rate of 2.9%, a solvent insoluble rate of 91%, an average particle diameter of 9.1 μm and a surface charge density of +25 μC/m².

The particles B (white color particles) were produced in such a manner that acrylic urethane resin: EAU53B (Asia Industry Co., Ltd.)/IPDI cross-linking agent: Excel-Hardener HX (Asia Industry Co., Ltd.), titanium oxide 10 phr, charge control agent: BontronE89 (Asia Industry Co., Ltd.) 2 phr were added, mixed, ground and classified by the jet-mill. The thus produced particles B were white color particles having a water absorbing rate of 2.9%, a solvent insoluble rate of 91%, an average particle diameter of 7.0 μm and a surface charge density of −60 μC/m².

The particles A were filled in the cells by: moving the substrate with the rib (opposed substrate), the surface of which was treated by hexamethyldisilazan, in a dried container having a moisture of not greater than 40% RH; scattering the particles A as first particles in the container from a nozzle arranged at an upper portion of the container; and filling the scattered particles A in the cells on the substrate provided at a lower portion of the container. Continuously, the particles B were filled in the cells on the particles A by: scattering the particles B as second particles in the container from an another nozzle arranged at an upper portion of the container; and filling the scattered particles B in the cells, in which the particles A were previously filled, on the substrate provided at a lower portion of the container. The same amounts of the particles A and the particles B were mixed with each other, and a total volume occupying rate of the both particles with respect to a space between two substrates stacked with a distance was controlled to become 22 vol %.

Then, with respect to the substrate whose cells were filled by the particles A and the particles B, another substrate (the transparent substrate, the surface of which was treated by hexamethyldisilazan) was stacked. In this case, the peripheral portions of the substrates were connected with each other by using an epoxy adhesive and the particles were sealed therein, so that the display device was manufactured. After that, the estimations of the display function of the thus manufactured display device were performed. The results of the estimations were shown in the following Table 1.

EXAMPLE 2 (LIQUID POWDERS)

The display panel was manufactured in the same manner as that of the example 1 except that the liquid powder X and the liquid powder Y mentioned below were used instead of the particles A and the particles B. The results of the estimations were shown in the following Table 1.

The liquid powders (liquid powder X, liquid powder Y) used here were as follows.

The liquid powder X was produced as follows. At first, methyl methacrylate monomer, $TiO_2$ (20 phr), charge control agent Bontron E89 (Orient Chemical Industries, Ltd.: 5 phr), initiator AIBN (0.5 phr) were suspended and polymerized. After that, particle diameters of the polymerized particles were graded by using a grading device. Then, by using hybridizer (Nara Machinery Co., Ltd.), the polymerized particles, external additive A (silica H2000, Wacker Ltd.) and external additive B (silica SS20, Japan Silica Ltd.) were set therein and treated at 4800 rpm for 5 minutes, so that the external additives were fixed on a surface of the polymerized particles to obtain the liquid powder.

The liquid powder Y was produced as follows. At first, styrene monomer, azo compounds (5 phr), charge control agent Bontron N07 (Orient Chemical Industries, Ltd.: 5 phr), initiator AIBN (0.5 phr) were suspended and polymerized. After that, particle sizes of the polymerized particles were graded by using a grading device. Then, by using hybridizer (Nara Machinery Co., Ltd.), the polymerized particles, external additive C (silica H2050, Wacker Ltd.) and external additive B (silica SS20, Japan Silica Ltd.) were set therein and treated at 4800 rpm for 5 minutes, so that the external additives were fixed on a surface of the polymerized particles to obtain the liquid powder.

A water content of the particles constituting the liquid powder X was 3.0%, a solvent insoluble rate thereof was 92%, an average particle diameter thereof was 3.3 µm, and a surface charge density thereof was +23 $\mu C/m^2$. A water content of the particles constituting the liquid powder Y was 2.8%, a solvent insoluble rate thereof was 92%, an average particle diameter thereof was 3.1 µm, and a surface charge density thereof was −58 $\mu C/m^2$.

COMPARATIVE EXAMPLE 1 (PARTICLES)

The display panel was manufactured in the same manner as that of the example 1 except that the transparent substrate and the opposed substrate, to which the surface treatment using hexamethyldisilazan was performed, were not used. The results of the estimations were shown in the following Table 1.

COMPARATIVE EXAMPLE 2 (LIQUID POWDERS)

The display panel was manufactured in the same manner as that of the example 2 except that the transparent substrate and the opposed substrate, to which the surface treatment using hexamethyldisilazan was performed, were not used. The results of the estimations were shown in the following Table 1.

TABLE 1

|  | Example 1 | Comparative Example 1 | Example 2 | Comparative Example 2 |
| --- | --- | --- | --- | --- |
| Hexamethyldisilazan treatment on substrate surface | conduct | not conduct | conduct | not conduct |
| Initial contrast ratio (a) | 8.2 | 8.2 | 8.2 | 8.2 |
| Contrast ratio after 10000 times repetition (b) | 7.8 | 6.6 | 8.0 | 7.0 |
| Maintaining rate (b)/(a) (%) | 95 | 80 | 98 | 85 |
| Contrast ratio after 5 days left (c) | 7.8 | 6.2 | 8.0 | 6.8 |
| Maintaining rate (c)/(a) (%) | 95 | 76 | 98 | 83 |

From the results shown in Table 1, it is understood that the example 1 (particles) and the example 2 (liquid powders), in which the substrate surface is subjected to the hydrophobic treatment using hexamethyldisilazan, have the same initial contrast ratio but have an excellent contrast ratio after repetition as compared with the comparative example 1 (particles) and the comparative example 2 (liquid powders), in which the substrate surface is not subjected to the hydrophobic treatment using hexamethyldisilazan. From these results, it is understood that the image display panel according to the invention has an excellent durability after repetition.

(2) Experiments According to the Second to the Fourth Aspects of the Invention:

As for the image display panel obtained according to the examples and the comparative examples according to the second to the fourth aspect of the invention, estimations were performed in accordance with the standards mentioned below.

(Universal Hardness)

By using a universal hardness measuring apparatus H100VP-HCU manufactured by Fischer Instrument Inc., it was measured by the steps of: preparing a glass substrate having a universal hardness of 2000 $N/mm^2$; arranging a measuring specimen made of a material to be measured and having a thickness of 3 µm on the glass substrate; and performing the measurement.

(Estimation of Display Function)

The image display panel manufactured by sealing the particles or the liquid powders having different colors and different charge characteristics in the cells between the substrates was installed in the display device. The results of the display function was performed in such a manner that black color display and white color display were repeated by inversing a potential of 250 V applied to the display device and then the display image after the black color display and the white color display were repeated at 100,000 times was enlarged by an optical microscope and was observed by naked eyes.

As to the second aspect of the invention:

EXAMPLE 11 (PARTICLES)

The image display panel was manufactured as follows.

At first, a substrate (7 cm×7 cm□) with an electrode was prepared, and on the substrate, a rib having a height of 400 μm was produced to form a partition wall having a stripe shape.

The production of the rib was performed as follows. As an inorganic powder, a glass powder was prepared by melting, cooling and grinding a mixture of $SiO_2$, $Al_2O_3$, $B_2O_3$, $Bi_2O_3$, and ZnO. As a resin, epoxy resin having a heat hardening property was prepared. Then, the glass powder and the epoxy resin were mixed with a solvent and controlled to be a viscosity of 12000 cps, so that a paste was produced. Then, the paste was applied on the substrate and heated at 150° C. to be hardened. By repeating the above paste applying and heating steps, a thickness (corresponding to a height of the partition wall) was controlled to be 400 μm. Then, a dry photo-resist was adhered. With respect to the adhered dry photo-resist, an exposing step and an etching step were performed so as to form a mask by which a partition wall pattern having a line of 50 μm, a space of 400 μm and a pitch of 450 μm can be formed. Then, unnecessary portions were removed by sand-blasting to form a predetermined partition wall having a stripe shape.

With respect to the surface of the partition wall thus manufactured, 2 g of hexamethyldisilazan was dropped and it was dried, so that an opposed substrate, in which the surface of the partition wall was treated, was manufactured.

Then, two kinds of the particles (particles A, particles B) were prepared.

The particles A were produced in such a manner that acrylic urethane resin: EAU53B (Asia Industry Co., Ltd.)/ IPDI cross-linking agent: Excel-Hardener HX (Asia Industry Co., Ltd.), CB (Carbon Black) 4 phr, charge control agent: BontronN07 (Orient Chemical Industries Ltd.) 2 phr were added, mixed, ground and classified by a jet-mill. The thus produced particles A were black color particles having a water absorbing rate of 2.9%, a solvent insoluble rate of 91%, and an average particle diameter of 9.1 μm.

The particles B were produced in such a manner that acrylic urethane resin: EAU53B (Asia Industry Co., Ltd.)/ IPDI cross-linking agent: Excel-Hardener HX (Asia Industry Co., Ltd.), titanium oxide 10 phr, charge control agent: BontronE89 (Asia Industry Co., Ltd.) 2 phr were added, mixed, ground and classified by the jet-mill. The thus produced particles B were white color particles having a water absorbing rate of 2.9%, a solvent insoluble rate of 91%, and an average particle diameter of 7.0 μm.

The particles A were filled in the cells by: moving the substrate with the rib (opposed substrate), in which the surface of partition wall was treated by hexamethyldisilazan, in a dried container having a moisture of not greater than 40% RH; scattering the particles A as first particles in the container from a nozzle arranged at an upper portion of the container; and filling the scattered particles A in the cells on the substrate provided at a lower portion of the container. Continuously, the particles B were filled in the cells on the particles A by: scattering the particles B as second particles in the container from an another nozzle arranged at an upper portion of the container; and filling the scattered particles B in the cells, in which the particles A were previously filled, on the substrate provided at a lower portion of the container. The same amounts of the particles A and the particles B were mixed with each other, and a total volume occupying rate of the both particles with respect to a space between two substrates stacked with a distance was controlled to become 22 vol %.

Then, with respect to the substrate whose cells were filled by the particles, another substrate with no rib (the transparent substrate) was stacked. In this case, the peripheral portions of the substrates were connected with each other by using an epoxy adhesive and the particles were sealed therein, so that the display device was manufactured. The results of the estimations were shown in the following Table 2.

EXAMPLE 12 (LIQUID POWDERS)

The display panel was manufactured in the same manner as that of the example 11 except that the liquid powder X and the liquid powder Y mentioned below were used instead of the particles A and the particles B. The results of the estimations were shown in the following Table 2.

The liquid powders (liquid powder X, liquid powder Y) used here were as follows.

The liquid powder X was produced as follows. At first, methyl methacrylate monomer, $TiO_2$ (20 phr), charge control agent Bontron E89 (Orient Chemical Industries, Ltd.: 5 phr), initiator AIBN (0.5 phr) were suspended and polymerized. After that, particle diameters of the polymerized particles were graded by using a grading device. Then, by using hybridizer (Nara Machinery Co., Ltd.), the polymerized particles, external additive A (silica H2000, Wacker Ltd.) and external additive B (silica SS20, Japan Silica Ltd.) were set therein and treated at 4800 rpm for 5 minutes, so that the external additives were fixed on a surface of the polymerized particles to obtain the liquid powders. A water content of the particles constituting the liquid powder X was 3.0%, a solvent insoluble rate thereof was 92%, and an average particle diameter thereof was 3.3 μm.

The liquid powder Y was produced as follows. At first, styrene monomer, azo compounds (5 phr), charge control agent Bontron N07 (Orient Chemical Industries, Ltd.: 5 phr), initiator AIBN (0.5 phr) were suspended and polymerized. After that, particle sizes of the polymerized particles were graded by using a grading device. Then, by using hybridizer (Nara Machinery Co., Ltd.), the polymerized particles, external additive C (silica H2050, Wacker Ltd.) and external additive B (silica SS20, Japan Silica Ltd.) were set therein and treated at 4800 rpm for 5 minutes, so that the external additives were fixed on a surface of the polymerized particles to obtain the liquid powder. A water content of the particles constituting the liquid powder Y was 2.8%, a solvent insoluble rate thereof was 92%, and an average particle diameter thereof was 3.1 μm.

COMPARATIVE EXAMPLE 11 (PARTICLES)

The display panel was manufactured in the same manner as that of the example 11 except that the surface treatment of the partition wall using hexamethyldisilazan was not performed. The results of the estimations were shown in the following Table 2.

COMPARATIVE EXAMPLE 12 (LIQUID POWDERS)

The display panel was manufactured in the same manner as that of the example 12 except that the surface treatment of the partition wall using hexamethyldisilazan was not performed. The results of the estimations were shown in the following Table 2.

TABLE 2

|  | Example 11 | Comparative Example 11 | Example 12 | Comparative Example 12 |
| --- | --- | --- | --- | --- |
| Particles (or liquid powders) sealed in cell | white particles/ black particles | white particles/ black particles | white liquid powder/black liquid powder | white liquid powder/black liquid powder |
| Hexamethyldisilazan treatment on partition wall surface | conduct | not conduct | conduct | not conduct |
| Display image after 100,000 times repetition: result of visual observation | excellent | uneven image | excellent | uneven image |
| Display image after 100,000 times repetition: particle adhesion to partition wall surface | not generate | generate | not generate | generate |

As to the third aspect of the invention:

EXAMPLE 13 (PARTICLES)

The display panel was manufactured in the same manner as that of the example 11 except that the surface treatment of the partition wall using hexamethyldisilazan was not performed and the surface of the partition wall was coated by fluorocarbon resin having a small charge decay property (LF710N manufactured by ASAHI GLASS CO., LTD.). The results of the estimations were shown in the following Table 3.

EXAMPLE 14 (LIQUID POWDERS)

The display panel was manufactured in the same manner as that of the example 12 except that the surface treatment of the partition wall using hexamethyldisilazan was not performed and the surface of the partition wall was coated by fluorocarbon resin having a small charge decay property (LF710N manufactured by ASAHI GLASS CO., LTD.). The results of the estimations were shown in the following Table 3.

COMPARATIVE EXAMPLE 13 (PARTICLES)

The display panel was manufactured in the same manner as that of the example 13 except that the surface of the partition wall was not coated by fluorocarbon resin having a small charge decay property (LF710N manufactured by ASAHI GLASS CO., LTD.). The results of the estimations were shown in the following Table 3.

COMPARATIVE EXAMPLE 14 (LIQUID POWDERS)

The display panel was manufactured in the same manner as that of the example 14 except that the surface of the partition wall was not coated by fluorocarbon resin having a small charge decay property (LF710N manufactured by ASAHI GLASS CO., LTD.). The results of the estimations were shown in the following Table 3.

TABLE 3

|  | Example 13 | Comparative Example 13 | Example 14 | Comparative Example 14 |
| --- | --- | --- | --- | --- |
| Particles (or liquid powders) sealed in cell | white particles/ black particles | white particles/ black particles | white liquid powder/black liquid powder | white liquid powder/black liquid powder |
| Fluorocarbon resin coating (LF710N) to partition wall surface | conduct | not conduct | conduct | not conduct |
| Display image after 100,000 times repetition: result of visual observation | excellent | Uneven image | excellent | uneven image |
| Display image after 100,000 times repetition: particle adhesion to partition wall surface | not generate | generate | not generate | generate |

As to the fourth aspect of the invention:

EXAMPLE 15 (PARTICLES)

The image display panel was manufactured as follows.

At first, a substrate (7 cm×7 cm□) with an electrode was prepared, and on the substrate, a rib having a height of 400 μm was produced to form a partition wall having a stripe shape.

The production of the rib was performed as follows. As an inorganic powder, a glass powder was prepared by melting, cooling and grinding a mixture of $SiO_2$, $Al_2O_3$, $B_2O_3$, $Bi_2O_3$, and ZnO. As a resin, epoxy resin having a heat hardening property was prepared. Then, the glass powder and the epoxy resin were mixed with a solvent and controlled to be a viscosity of 12000 cps, so that a paste was produced. Then, the paste was applied on the substrate and heated at 150° C. to be hardened. By repeating the above paste applying and heating steps, a thickness (corresponding to a height of the partition wall) was controlled to be 400 μm. Then, a dry photo-resist was adhered. With respect to the adhered dry photo-resist, an exposing step and an etching step were performed so as to form a mask by which a partition wall pattern having a line of 50 μm, a space of 400 μm and a pitch of 450 μm can be formed. Then, unnecessary portions were removed by sandblasting to form a predetermined partition wall having a stripe shape.

Then, two kinds of the particles (particles A, particles B) were prepared in the same manner as that of the example 11, and the image display panel was manufactured in the same method as that of the example 11.

Moreover, only the binder resin used for manufacturing the partition wall mentioned above (epoxy resin having a thermosetting property) was coated to the glass substrate having a universal hardness of 2000 $N/mm^2$ to be a thickness of 3 μm, and it was heated at 120° C. and was hardened, so that a universal hardness of the binder resin (epoxy resin having a heat hardening property) was measured. The results of the estimations were shown in the following Table 3.

EXAMPLE 16 (LIQUID POWDERS)

The partition wall was manufactured in the same manner as that of the example 15, and the image display panel was manufactured in the same manner as that of the example 15 except that the two kinds of the liquid powder X and the liquid powder Y as is the same as the example 12. The universal hardness of the binder resin used for manufacturing the partition wall (epoxy resin having a thermosetting property) was measured in the same manner as that of the example 15. The results of the estimations were shown in the following Table 4.

COMPARATIVE EXAMPLE 15 (PARTICLES)

The image display panel was manufactured in the same manner as that of the example 15 except that a temperature for hardening the binder resin used for the partition wall paste (epoxy resin having a thermosetting property) was set to 120° C.

Moreover, only the binder resin used for manufacturing the partition wall mentioned above (epoxy resin having a thermosetting property) was coated to the glass substrate having a universal hardness of 2000 $N/mm^2$ to be a thickness of 3 μm, and it was heated at 120° C. and was hardened, so that a universal hardness of the binder resin (epoxy resin having a heat hardening property) was measured. The results of the estimations were shown in the following Table 4.

COMPARATIVE EXAMPLE 16 (LIQUID POWDERS)

The image display panel was manufactured in the same manner as that of the example 16 except that a temperature for hardening the binder resin used for the partition wall paste (epoxy resin having a thermosetting property) was set to 120° C. The universal hardness of the binder resin used for manufacturing the partition wall (epoxy resin having a thermosetting property) was measured in the same manner as that of the comparative example 15. The results of the estimations were shown in the following Table 4.

TABLE 4

|  | Example 15 | Comparative Example 15 | Example 16 | Comparative Example 16 |
|---|---|---|---|---|
| Particles (or liquid powders) sealed in cell | white particles/ black particles | white particles/ black particles | white liquid powder/black liquid powder | white liquid powder/black liquid powder |
| Universal hardness of binder resin for partition wall ($N/mm^2$) | 450 | 340 | 450 | 340 |
| Display image after 100,000 times repetition: result of visual observation | excellent | uneven image | excellent | uneven image |
| Display image after 100,000 times repetition: particle adhesion to partition wall surface | not generate | generate | not generate | generate |

From the results of Table 2 to Table 4 mentioned above, it is understood that the image display panels according to the second to the fourth aspects of the invention have an excellent durability as compared with the comparative examples.

(3) Experiment According to the Fifth Aspect of the Invention:

With respect to the thus manufactured image display panels, measurements and estimations of the functions as the display panel in accordance with the following standards. The results were shown in the following Table 5 and Table 6.

EXAMPLE 21(PARTICLES)

The image display panel was manufactured as follows.

At first, a substrate (7 cm×7 cm☐) with an electrode was prepared, and on the substrate, a rib having a height of 400 μm was produced to form a partition wall having a stripe shape.

The production of the rib was performed as follows. As an inorganic powder, a glass powder was prepared by melting, cooling and grinding a mixture of $SiO_2$, $Al_2O_3$, $B_2O_3$, $Bi_2O_3$, and ZnO. As a resin, epoxy resin having a heat hardening property was prepared. Then, the glass powder and the epoxy resin were mixed with a solvent and controlled to be a viscosity of 12000 cps, so that a paste was produced. Then, the paste was applied on the substrate and heated at 150° C. to be hardened. By repeating the above paste applying and heating steps, a thickness (corresponding to a height Lh of the partition wall) was controlled to be 50 μm. Then, a dry photo-resist was adhered. With respect to the adhered dry photo-resist, an exposing step and an etching step were performed so as to form a mask by which a partition wall pattern having a line (corresponding to a width Lw of the partition wall) of 50 μm, a space of 300 μm and a pitch of 350 μm can be formed. Then, unnecessary portions were removed by sandblasting to form a predetermined partition wall having a stripe shape. In this case, a ratio Lh/Lw between the height and the width of the partition wall 4 was 50/50=1.

Then, two kinds of the particles (particles A, particles B) were prepared.

The particles A (black color particles) were produced in such a manner that acrylic urethane resin: EAU53B (Asia Industry Co., Ltd.)/IPDI cross-linking agent: Excel-Hardener HX (Asia Industry Co., Ltd.), Carbon M100 (manufactured by MITSUBISHI CHEMICAL Co., Ltd.) 4 phr, charge control agent: BontronN07 (Orient Chemical Industries Ltd.) 2 phr were added, mixed, ground and classified by a jet-mill.

The particles B (white color particles) were produced in such a manner that acrylic urethane resin: EAU53B (Asia Industry Co., Ltd.)/IPDI cross-linking agent: Excel-Hardener HX (Asia Industry Co., Ltd.), titanium oxide 10 phr, charge control agent: BontronE89 (Asia Industry Co., Ltd.) 2 phr were added, mixed, ground and classified by the jet-mill.

The particles A were filled in the cells by scattering the particles A as first particles in the container from a nozzle arranged at an upper portion of the container; and filling the scattered particles A in the cells on the substrate provided at a lower portion of the container. Continuously, the particles B were filled in the cells on the particles A by: scattering the particles B as second particles in the container from an another nozzle arranged at an upper portion of the container; and filling the scattered particles B in the cells, in which the particles A were previously filled, on the substrate provided at a lower portion of the container. The same amounts of the particles A and the particles B were mixed with each other, and a filling rate (total volume occupying rate) of the both particles with respect to a space between two glass substrates stacked with a distance was controlled to become 25 vol %.

Then, with respect to the substrate 1 whose cells were filled by the particles A and the particles B, a glass substrate 2 to which indium oxide electrodes having a thickness of about 500 Å was stacked. In this case, the peripheral portions of the substrates were connected with each other by using an epoxy adhesive and the particles were sealed therein, so that the image display panel was manufactured. Here, as a gas for filling the gap, use was made of a dried nitrogen gas having a dew point of −40° C. The thus manufactured image display panel had an opening rate, a white reflectance and a contrast ratio shown in Table 5.

EXAMPLE 22 (PARTICLES)

The image display panel was manufactured in the same manner as that of the above example 21 except that the ratio between the height and the width of the partition wall 4 was controlled to be Lh/Lw=50/10=5 by changing the height Lh of the partition wall 4 to 50 μm and the width Lw of the partition wall 4 to 10 μm. The thus manufactured image display panel had an opening rate, a white reflectance and a contrast ratio shown in Table 5.

EXAMPLE 23 (PARTICLES)

The image display panel was manufactured in the same manner as that of the above example 21 except that the ratio between the height and the width of the partition wall 4 was controlled to be Lh/Lw=50/5=10 by changing the height Lh of the partition wall 4 to 50 μm and the width Lw of the partition wall 4 to 5 μm. The thus manufactured image display panel had an opening rate, a white reflectance and a contrast ratio shown in Table 5.

EXAMPLE 24 (PARTICLES)

The image display panel was manufactured in the same manner as that of the above example 21 except that the ratio between the height and the width of the partition wall 4 was controlled to be Lh/Lw=50/100=0.5 by changing the height Lh of the partition wall 4 to 50 μm and the width Lw of the partition wall 4 to 100 μm. The thus manufactured image display panel had an opening rate, a white reflectance and a contrast ratio shown in Table 5.

EXAMPLE 25 (PARTICLES)

The image display panel was manufactured in the same manner as that of the above example 21 except that the ratio between the height and the width of the partition wall 4 was controlled to be Lh/Lw=100/5=20 by changing the height Lh of the partition wall 4 to 100 μm and the width Lw of the partition wall 4 to 5 μm. The thus manufactured image display panel had an opening rate, a white reflectance and a contrast ratio shown in Table 5.

EXAMPLE 26 (LIQUID POWDERS)

The image display panel was manufactured as follows.

At first, a substrate (7 cm×7 cm☐) with an electrode was prepared, and on the substrate, a rib having a height of 400 μm was produced to form a partition wall having a stripe shape.

The production of the rib was performed as follows. As an inorganic powder, a glass powder was prepared by melting, cooling and grinding a mixture of $SiO_2$, $Al_2O_3$, $B_2O_3$, $Bi_2O_3$, and ZnO. As a resin, epoxy resin having a heat hardening property was prepared. Then, the glass powder and the epoxy resin were mixed with a solvent and controlled to be a viscosity of 12000 cps, so that a paste was produced. Then, the paste was applied on the substrate and heated at 150° C. to be hardened. By repeating the above paste applying and heating steps, a thickness (corresponding to a height Lh of the partition wall) was controlled to be 50 μm. Then, a dry photo-resist was adhered. With respect to the adhered dry photo-resist, an exposing step and an etching step were performed so as to form a mask by which a partition wall pattern having a line (corresponding to a width Lw of the partition wall) of 50 μm, a space of 300 μm and a pitch of 350 μm can be formed. Then, unnecessary portions were removed by sandblasting to form a predetermined partition wall having a stripe shape. In this case, a ratio Lh/Lw between the height and the width of the partition wall 4 was 50/50=1.

Then, two kinds of liquid powders (white liquid powder, black liquid powder) were prepared.

The white liquid powder (liquid powder X) was produced as follows. At first, methyl methacrylate monomer, $TiO_2$ (20 phr), charge control agent Bontron E89 (Orient Chemical Industries, Ltd.: 5 phr), initiator AIBN (0.5 phr) were suspended and polymerized. After that, particle diameters of the polymerized particles were graded by using a grading device. Then, by using hybridizer (Nara Machinery Co., Ltd.), the polymerized particles, external additive A (silica H2000, Wacker Ltd.) and external additive B (silica SS20, Japan Silica Ltd.) were set therein and treated at 4800 rpm for 5 minutes, so that the external additives were fixed on a surface of the polymerized particles to obtain the liquid powder.

The black liquid powder (liquid powder Y) was produced as follows. At first, styrene monomer, azo compounds (5 phr), charge control agent Bontron N07 (Orient Chemical Industries, Ltd.: 5 phr), initiator AIBN (0.5 phr) were suspended and polymerized. After that, particle sizes of the polymerized particles were graded by using a grading device. Then, by using hybridizer (Nara Machinery Co., Ltd.), the polymerized particles, external additive C (silica H2050, Wacker Ltd.) and external additive B (silica SS20, Japan Silica Ltd.) were set therein and treated at 4800 rpm for 5 minutes, so that the external additives were fixed on a surface of the polymerized particles to obtain the liquid powder.

The liquid powder X was filled in the cells by scattering the liquid powder X as first particles in the container from a nozzle arranged at an upper portion of the container; and filling the scattered liquid powder X in the cells on the substrate provided at a lower portion of the container. Continuously, the liquid powder Y was filled in the cells on the liquid powder X by: scattering the liquid powder Y as second particles in the container from an another nozzle arranged at an upper portion of the container; and filling the scattered liquid powder Y in the cells, in which the liquid powder X was previously filled, on the substrate provided at a lower portion of the container. The same amounts of the liquid powder X and the liquid powder Y were mixed with each other, and a filling rate (total volume occupying rate) of the both liquid powders with respect to a space between two glass substrates stacked with a distance was controlled to become 25 vol %.

Then, with respect to the substrate 1 whose cells were filled by the liquid powder X and the liquid powder Y, a glass substrate 2 to which indium oxide electrodes having a thickness of about 500 Å was stacked. In this case, the peripheral portions of the substrates were connected with each other by using an epoxy adhesive and the particles were sealed therein, so that the image display panel was manufactured. Here, as a gas for filling the gap, use was made of a dried nitrogen gas having a dew point of −40° C. The thus manufactured image display panel had an opening rate, a white reflectance and a contrast ratio shown in Table 6.

EXAMPLE 27 (LIQUID POWDERS)

The image display panel was manufactured in the same manner as that of the above example 26 except that the ratio between the height and the width of the partition wall 4 was controlled to be Lh/Lw=50/10=5 by changing the height Lh of the partition wall 4 to 50 μm and the width Lw of the partition wall 4 to 10 μm. The thus manufactured image display panel had an opening rate, a white reflectance and a contrast ratio shown in Table 6.

EXAMPLE 28 (LIQUID POWDERS)

The image display panel was manufactured in the same manner as that of the above example 26 except that the ratio between the height and the width of the partition wall 4 was controlled to be Lh/Lw=50/5=10 by changing the height Lh of the partition wall 4 to 50 μm and the width Lw of the partition wall 4 to 5 μm. The thus manufactured image display panel had an opening rate, a white reflectance and a contrast ratio shown in Table 6.

EXAMPLE 29 (LIQUID POWDERS)

The image display panel was manufactured in the same manner as that of the above example 26 except that the ratio between the height and the width of the partition wall 4 was controlled to be Lh/Lw=50/100=0.5 by changing the height Lh of the partition wall 4 to 50 μm and the width Lw of the partition wall 4 to 100 μm. The thus manufactured image display panel had an opening rate, a white reflectance and a contrast ratio shown in Table 6.

EXAMPLE 30 (LIQUID POWDERS)

The image display panel was manufactured in the same manner as that of the above example 26 except that the ratio between the height and the width of the partition wall 4 was controlled to be Lh/Lw=100/5=20 by changing the height Lh of the partition wall 4 to 100 μm and the width Lw of the partition wall 4 to 5 μm. The thus manufactured image display panel had an opening rate, a white reflectance and a contrast ratio shown in Table 6.

COMPARATIVE EXAMPLE 21 (PARTICLES)

The image display panel was manufactured in the same manner as that of the above example 21 except that the ratio between the height and the width of the partition wall 4 was controlled to be Lh/Lw=40/100=0.4 by changing the height Lh of the partition wall 4 to 40 μm and the width Lw of the partition wall 4 to 100 μm. The thus manufactured image display panel had an opening rate, a white reflectance and a contrast ratio shown in Table 5.

COMPARATIVE EXAMPLE 22 (PARTICLES)

The image display panel was tried to be manufactured in the same manner as that of the above example 21 satisfying a ratio between the height and the width of the partition wall 4 Lh/Lw=30. However, it was not possible to manufacture the image display panel since the partition wall having extremely slender cross section satisfying the above ratio had a bad productivity.

COMPARATIVE EXAMPLE 23 (LIQUID POWDERS)

The image display panel was manufactured in the same manner as that of the above example 26 except that the ratio between the height and the width of the partition wall 4 was controlled to be Lh/Lw=40/100=0.4 by changing the height Lh of the partition wall 4 to 40 μm and the width Lw of the partition wall 4 to 100 μm. The thus manufactured image display panel had an opening rate, a white reflectance and a contrast ratio shown in Table 6.

COMPARATIVE EXAMPLE 24 (LIQUID POWDERS)

The image display panel was tried to be manufactured in the same manner as that of the above example 26 satisfying a ratio between the height and the width of the partition wall 4 Lh/Lw=30. However, it was not possible to manufacture the image display panel since the partition wall having extremely slender cross section satisfying the above ratio had a bad productivity.

If summarized the above results, the opening rates of the image display panels according to the example 21 to the example 25 (as is the same as the example 26 to the example 30), which satisfy the above formula (1) of $0.5 \leqq Lh/Lw \leqq 20$, were 73.5, 94.4, 97.2, 51.0 and 98.6 respectively, and thus the desired opening rate could be achieved. On the contrary, the opening rate of the image display panel according to the comparative example 21 (as is the same as the comparative example 23) was 41.3, ant thus the minimum opening rate required in a practical use was not achieved. Moreover, the image display panel according to the comparative example 22 (as is the same as the comparative example 24) was not merely manufactured.

(Estimation of Display Function)

The estimation of the display function was performed by an image density of overall white image display (white reflectance: unit %) and a contrast ratio (white reflectance/black reflectance) between an image density of overall white image display (white reflectance: unit %) and an image density of overall black image display (black reflectance: unit %), in the case of white→black or black→white overall display image. As to the measurement of reflectance, use was made of a portable reflection densitometer RD19 (manufactured by GretagMacbeth Inc.).

(Measurement of Opening Rate)

The width of the partition wall (rib) was measured by means of an optical microscope, and a calculation was performed on the basis of the measured result.

|  | Example 21 | Example 22 | Example 23 | Example 24 | Example 25 | Comparative Example 21 | Comparative Example 22 |
|---|---|---|---|---|---|---|---|
| Lh (μm) | 50 | 50 | 50 | 50 | 100 | 40 | — |
| Lw (μm) | 50 | 10 | 5 | 100 | 5 | 100 | — |
| Lh/Lw | 1 | 5 | 10 | 0.5 | 20 | 0.4 | — |
| Opening rate (%) | 73.5 | 94.4 | 97.2 | 51.0 | 98.6 | 41.3 | — |
| White reflectance (%) | 29.4 | 37.7 | 38.9 | 20.4 | 42.1 | 18.3 | — |
| Contrast ratio | 9.8 | 12.6 | 13.0 | 6.8 | 15 | 4.2 | — |
| Remarks |  |  |  |  |  |  | not forming rib |

TABLE 6

|  | Example 26 | Example 27 | Example 28 | Example 29 | Example 30 | Comparative Example 23 | Comparative Example 24 |
|---|---|---|---|---|---|---|---|
| Lh (μm) | 50 | 50 | 50 | 50 | 100 | 40 | — |
| Lw (μm) | 50 | 10 | 5 | 100 | 5 | 100 | — |
| Lh/Lw | 1 | 5 | 10 | 0.5 | 20 | 0.4 | — |
| Opening rate (%) | 73.5 | 94.4 | 97.2 | 51.0 | 98.6 | 41.3 | — |
| White reflectance (%) | 29 | 37.2 | 38.3 | 20.1 | 42.1 | 18.3 | — |
| Contrast ratio | 9.8 | 12.2 | 13.0 | 6.7 | 15 | 4.2 | — |
| Remarks |  |  |  |  |  |  | not forming rib |

(4) Experiment According to the Sixth Aspect of the Invention:

With respect to the thus manufactured image display panels, measurements and estimations of the functions as the display panel in accordance with the following standards. The results were shown in the following Table 7 and Table 8.

EXAMPLE 41 (PARTICLES)

The image display panel was manufactured as follows.

At first, a substrate (7 cm×7 cm□) with an electrode was prepared, and on the substrate, a rib having a height of 400 μm was produced to form a partition wall having a stripe shape. In this case, as material used for the partition wall, use was made of a material having a water absorption rate of 0.1%.

The production of the rib was performed as follows. As an inorganic powder, a glass powder was prepared by melting, cooling and grinding a mixture of $SiO_2$, $Al_2O_3$, $B_2O_3$, $Bi_2O_3$, and ZnO. As a resin, epoxy resin having a heat hardening property was prepared. Then, the glass powder and the epoxy resin were mixed with a solvent and controlled to be a viscosity of 12000 cps, so that a paste was produced. Then, the paste was applied on the substrate and heated at 150° C. to be hardened. By repeating the above paste applying and heating steps, a thickness (corresponding to a height of the partition wall) was controlled to be 400 μm. Then, a dry photo-resist was adhered. With respect to the adhered dry photo-resist, an exposing step and an etching step were performed so as to form a mask by which a partition wall pattern having a line of 50 μm, a space of 400 μm and a pitch of 450 μm can be formed. Then, unnecessary portions were removed by sandblasting to form a predetermined partition wall having a stripe shape. In this manner, the cell was formed between the partition walls on the substrates.

Then, two kinds of the particles (particles A, particles B) were prepared.

The particles A (black color particles) were produced in such a manner that acrylic urethane resin: EAU53B (Asia Industry Co., Ltd.)/IPDI cross-linking agent: Excel-Hardener HX (Asia Industry Co., Ltd.), Carbon M100 (manufactured by MITSUBISHI CHEMICAL Co., Ltd.) 4 phr, charge control agent: BontronN07 (Orient Chemical Industries Ltd.) 2 phr were added, mixed, ground and classified by a jet-mill.

The particles B (white color particles) were produced in such a manner that acrylic urethane resin: EAU53B (Asia Industry Co., Ltd.)/IPDI cross-linking agent: Excel-Hardener HX (Asia Industry Co., Ltd.), titanium oxide 10 phr, charge control agent: BontronE89 (Asia Industry Co., Ltd.) 2 phr were added, mixed, ground and classified by the jet-mill.

The particles A were filled in the cells by scattering the particles A as first particles in the container from a nozzle arranged at an upper portion of the container; and filling the scattered particles A in the cells on the substrate provided at a lower portion of the container. Continuously, the particles B were filled in the cells on the particles A by: scattering the particles B as second particles in the container from an another nozzle arranged at an upper portion of the container; and filling the scattered particles B in the cells, in which the particles A were previously filled, on the substrate provided at a lower portion of the container. The same amounts of the particles A and the particles B were mixed with each other, and a filling rate (total volume occupying rate) of the both particles with respect to a space between two glass substrates stacked with a distance was controlled to become 25 vol %.

Then, with respect to the substrate 1 whose cells were filled by the particles A and the particles B, a glass substrate 2 to which indium oxide electrodes having a thickness of about 500 Å was stacked. In this case, the peripheral portions of the substrates were connected with each other by using an epoxy adhesive and the particles were sealed therein, so that the image display panel was manufactured. Here, as a gas for filling the gap, use was made of a dried nitrogen gas having a dew point of −40° C. The thus manufactured image display panel had a water absorption rate, an initial contrast ratio and a contrast ratio after endurance shown in Table 7.

EXAMPLE 42 (PARTICLES)

The image display panel was manufactured in the same manner as that of the example 41 except that use was made of a material having a water absorption rate of 5% as a material of the partition wall. The thus manufactured image display panel had a water absorption rate, an initial contrast ratio and a contrast ratio after endurance shown in Table 7.

EXAMPLE 43 (PARTICLES)

The image display panel was manufactured in the same manner as that of the example 41 except that use was made of a material having a water absorption rate of 10% as a material of the partition wall. The thus manufactured image display panel had a water absorption rate, an initial contrast ratio and a contrast ratio after endurance shown in Table 7.

EXAMPLE 44 (LIQUID POWDERS)

The image display panel was manufactured as follows.

At first, a substrate (7 cm×7 cm☐) with an electrode was prepared, and on the substrate, a rib having a height of 400 μm was produced to form a partition wall having a stripe shape. In this case, as material used for the partition wall, use was made of a material having a water absorption rate of 0.1%.

The production of the rib was performed as follows. As an inorganic powder, a glass powder was prepared by melting, cooling and grinding a mixture of $SiO_2$, $Al_2O_3$, $B_2O_3$, $Bi_2O_3$, and ZnO. As a resin, epoxy resin having a heat hardening property was prepared. Then, the glass powder and the epoxy resin were mixed with a solvent and controlled to be a viscosity of 12000 cps, so that a paste was produced. Then, the paste was applied on the substrate and heated at 150° C. to be hardened. By repeating the above paste applying and heating steps, a thickness (corresponding to a height of the partition wall) was controlled to be 400 μm. Then, a dry photo-resist was adhered. With respect to the adhered dry photo-resist, an exposing step and an etching step were performed so as to form a mask by which a partition wall pattern having a line of 50 μm, a space of 400 μm and a pitch of 450 μm can be formed. Then, unnecessary portions were removed by sandblasting to form a predetermined partition wall having a stripe shape. In this manner, the cell was formed between the partition walls on the substrates.

Then, two kinds of liquid powders (white liquid powder, black liquid powder) were prepared.

The white liquid powder (liquid powder X) was produced as follows. At first, methyl methacrylate monomer, $TiO_2$ (20 phr), charge control agent Bontron E89 (Orient Chemical Industries, Ltd.: 5 phr), initiator AIBN (0.5 phr) were suspended and polymerized. After that, particle diameters of the polymerized particles were graded by using a grading device. Then, by using hybridizer (Nara Machinery Co., Ltd.), the polymerized particles, external additive A (silica H2000, Wacker Ltd.) and external additive B (silica SS20, Japan Silica Ltd.) were set therein and treated at 4800 rpm for 5 minutes, so that the external additives were fixed on a surface of the polymerized particles to obtain the liquid powder.

The black liquid powder (liquid powder Y) was produced as follows. At first, styrene monomer, azo compounds (5 phr), charge control agent Bontron N07 (Orient Chemical Industries, Ltd.: 5 phr), initiator AIBN (0.5 phr) were suspended and polymerized. After that, particle sizes of the polymerized particles were graded by using a grading device. Then, by using hybridizer (Nara Machinery Co., Ltd.), the polymerized particles, external additive C (silica H2050, Wacker Ltd.) and external additive B (silica SS20, Japan Silica Ltd.) were set therein and treated at 4800 rpm for 5 minutes, so that the external additives were fixed on a surface of the polymerized particles to obtain the liquid powder.

The liquid powder X was filled in the cells by scattering the liquid powder X as first particles in the container from a nozzle arranged at an upper portion of the container; and filling the scattered liquid powder X in the cells on the substrate provided at a lower portion of the container. Continuously, the liquid powder Y was filled in the cells on the liquid powder X by: scattering the liquid powder Y as second particles in the container from an another nozzle arranged at an upper portion of the container; and filling the scattered liquid powder Y in the cells, in which the liquid powder X was previously filled, on the substrate provided at a lower portion of the container. The same amounts of the liquid powder X and the liquid powder Y were mixed with each other, and a filling rate (total volume occupying rate) of the both liquid powders with respect to a space between two glass substrates stacked with a distance was controlled to become 25 vol %.

Then, with respect to the substrate 1 whose cells were filled by the liquid powder X and the liquid powder Y, a glass substrate 2 to which indium oxide electrodes having a thickness of about 500 Å was stacked. In this case, the peripheral portions of the substrates were connected with each other by using an epoxy adhesive and the particles were sealed therein, so that the image display panel was manufactured. Since two substrates were adhered and sealed in a container in which a dried nitrogen gas having a dew point of −40° C. was filled, a gap between the substrates in the assembled display panel was filled by a dried nitrogen gas (dew point: −40° C.). The thus manufactured image display panel had a water absorption rate, an initial contrast ratio and a contrast ratio after endurance shown in Table 8.

EXAMPLE 45 (LIQUID POWDERS)

The image display panel was manufactured in the same manner as that of the example 44 except that use was made of a material having a water absorption rate of 5% as a material of the partition wall. The thus manufactured image display panel had a water absorption rate, an initial contrast ratio and a contrast ratio after endurance shown in Table 8.

EXAMPLE 46 (LIQUID POWDERS)

The image display panel was manufactured in the same manner as that of the example 44 except that use was made of a material having a water absorption rate of 10% as a material of the partition wall. The thus manufactured image display panel had a water absorption rate, an initial contrast ratio and a contrast ratio after endurance shown in Table 8.

COMPARATIVE EXAMPLE 41 (PARTICLES)

The image display panel was manufactured in the same manner as that of the example 41 except that use was made of a material having a water absorption rate of 0.1% as a material of the partition wall. The thus manufactured image display panel had a water absorption rate, an initial contrast ratio and a contrast ratio after endurance shown in Table 8, and a display performance was deteriorated after endurance.

COMPARATIVE EXAMPLE 42 (PARTICLES)

The image display panel was manufactured in the same manner as that of the example 41 except that use was made of a material having a water absorption rate of 20% as a material of the partition wall. The thus manufactured image display panel had a water absorption rate, an initial contrast ratio and a contrast ratio after endurance shown in Table 8, and a display performance was bad initially.

COMPARATIVE EXAMPLE 43 (LIQUID POWDERS)

The image display panel was manufactured in the same manner as that of the example 44 except that use was made of a material having a water absorption rate of 0.1% as a material of the partition wall. The thus manufactured image display panel had a water absorption rate, an initial contrast ratio and a contrast ratio after endurance shown in Table 8, and a display performance was deteriorated after endurance.

COMPARATIVE EXAMPLE 44 (LIQUID POWDERS)

The image display panel was manufactured in the same manner as that of the example 44 except that use was made of a material having a water absorption rate of 20% as a material of the partition wall. The thus manufactured image display panel had a water absorption rate, an initial contrast ratio and a contrast ratio after endurance shown in Table 8, and a display performance was bad initially.

If summarized the above results, in the image display panel according to the example 41 to the example 43 (as is the same as the example 44 to the example 46) using the partition wall having a water absorption rate S satisfying the above formula (3) of $0.1\% \leq S \leq 10\%$, a variation between the initial contrast ratio and the contrast ratio after endurance was small, and a desired display performance could be achieved.

On the contrary, in the image display panel according to the comparative example 41 (as is the same as the comparative example 43), a water absorption performance of the partition wall was insufficient, and an inversion property became deteriorated due to a water included in the system, so that a variation (decrease) between the initial contrast ratio and the contrast ratio after endurance was extremely large. Moreover, in the image display panel according to the comparative example 42 (as is the same as the comparative example 44), a water absorption rate of the partition wall was too high, and a water was absorbed excessively during an assemble process, so that undesirable effects were affected to the display performance initially.

(Estimation of Display Function)

The estimation of the display function was performed by an image density of overall white image display (white reflectance: unit %) and a contrast ratio (white reflectance/black reflectance) between an image density of overall white image display (white reflectance: unit %) and an image density of overall black image display (black reflectance: unit %), in the case of white→black or black→white overall display image. As to the measurement of reflectance, use was made of a portable reflection densitometer RD19 (manufactured by GretagMacbeth Inc.).

(Measurement of Water Absorption Rate of Partition Wall)

The water absorption rate of the partition wall was measured in accordance with ASTM-D570 with respect to the partition wall formed on the substrate under measuring condition at 23° C. for 24 hours.

TABLE 7

|  | Example 41 | Example 42 | Example 43 | Comparative Example 41 | Comparative Example 42 |
|---|---|---|---|---|---|
| Water absorption rate (%) | 0.1 | 5 | 10 | 0.05 | 20 |
| Initial contrast ratio | 10 | 10 | 10 | 10 | 3 |

TABLE 7-continued

|  | Example 41 | Example 42 | Example 43 | Comparative Example 41 | Comparative Example 42 |
|---|---|---|---|---|---|
| Contrast ratio after endurance | 9.2 | 9.5 | 9.4 | 6 | 1 |
| Remarks |  |  |  | display performance is deteriorated after endurance | display performance is not good from initial state |

TABLE 8

|  | Example 44 | Example 45 | Example 46 | Comparative Example 43 | Comparative Example 44 |
|---|---|---|---|---|---|
| Water absorption rate (%) | 0.1 | 5 | 10 | 0.05 | 20 |
| Initial contrast ratio | 10.1 | 10.1 | 10.1 | 10.1 | 3.2 |
| Contrast ratio after endurance | 9.3 | 9.4 | 9.3 | 6.2 | 1.1 |
| Remarks |  |  |  | display performance is deteriorated after endurance | display performance is not good from initial state |

INDUSTRIALLY APPLICABILITY

The image display device according to the invention is applicable to the image display unit for mobile equipment such as notebook personal computers, PDAs, cellular phones and so on; to the electric paper for electric book, electric newspaper and so on; to the bulletin boards such as signboards, posters, blackboards and so on; to the image display unit for electric calculator, home electric application products, auto supplies and so on; to the card display unit for point card, IC card and so on; and to the display unit for electric POP, electric advertisement, electric price tag, electric musical score, RF-ID device and so on.

The invention claimed is:

1. An image display panel: in which at least one group of particles or liquid powders is sealed between opposed substrates, at least one of two substrates being transparent; and in which the particles or the liquid powders, to which an electrostatic field is applied, are made to move so as to display an image; characterized in that use is made of the substrate in which at least a surface, to which the particles or the liquid powders are contacted, is subjected to a hydrophobic treatment.

2. The image display panel according to claim 1, wherein, as the substrate in which the surface, to which the particles or the liquid powders are contacted, is subjected to the hydrophobic treatment, use is made of a substrate in which a surface is subjected to a hexamethyldisilazan treatment.

3. The image display panel according to claim 2, wherein, prior to the hexamethyldisilazan treatment, OH group adding process is performed.

4. The image display panel according to claim 1, wherein a water absorption rate of the particles or the liquid powders sealed between the substrates, which is measured according to ASTM D570 at 23° C. for 24 hours, is not greater than 3%.

5. The image display panel according to claim 1, wherein a volume occupying rate of the particles or the liquid powders sealed between the substrates is in a range of 3-70 vol %.

6. An image display panel: in which one or more than two cells surrounded by partition walls are formed between opposed two substrates with a predetermined distance, at least one of two substrates being transparent; in which particles or liquid powders are accommodated in respective cells; and in which the particles or the liquid powders, to which an electrostatic field is applied, are made to move so as to display an image; characterized in that at least a surface of the partition wall, to which the particles or the liquid powders are contacted, is subjected to a hydrophobic treatment.

7. The image display panel according to claim 6, wherein the surface of the partition wall, to which the particles or the liquid powders are contacted, is subjected to the hydrophobic treatment using hexamethyldisilazan.

8. The image display panel according to claim 7, wherein, prior to the hydrophobic treatment using hexamethyldisilazan, OH group adding process is performed.

9. An image display panel: in which one or more than two cells surrounded by partition walls are formed between opposed two substrates with a predetermined distance, at least one of two substrates being transparent, to which an electrostatic field is applied, are made to move so as to display an image; characterized in that at least a surface of the partition wall, to which the particles or the liquid powders are contacted, is coated by a material having a small charge decay property.

10. The image display panel according to claim 9, wherein the material having a small charge decay property is a resin including fluorocarbon resin, and, as the fluorocarbon resin, use is made of one or more than two kinds of tetrafluoroethylene-perfluoroalkylvinylether copolymer, tetrafluoroethylene-hexafluoropropylene-perfluoroalkylvinylether copolymer, tetrafluoroethylene-ethylene copolymer, polychlorotrifluoroethylene, chlorotrifluoro ethylene-ethylene copolymer, polytetrafluoroethylene, polyfluoride and polyvinylfluoride.

11. The image display panel according to claim 9, wherein the material having a small charge decay property coated to a surface of the partition wall has such a property measured by a charge decay property measuring method using a coating material as a film that the maximum surface potential, in the case that the surface thereof is charged by a generation of Corona discharge caused by applying a voltage of 8 KV to a Corona discharge device deployed at a distance of 1 mm from the surface, is 300 V or greater at 0.3 second after the Corona discharge.

12. An image display panel: in which one or more than two cells surrounded by partition walls are formed between opposed two substrates with a predetermined distance, at least one of two substrates being transparent; in which particles or liquid powders are accommodated in respective cells; and in which the particles or the liquid powders, to which an electrostatic field is applied, are made to move so as to display an image; characterized in that a universal hardness of a binder resin used for a material constituting the partition wall is not less than 400 N/mm2, which is obtained by a method of measuring a universal hardness in which the binder resin constituting the partition wall having a thickness of 3 μm is formed on a glass substrate having a universal hardness of 2000 N/mm2.

13. The image display panel according to claim 6, wherein a water absorption rate of the particles or the liquid powders sealed between the substrate, which is measured according to ASTM D570 at 23° C. for 24 hours, is not greater than 3%.

14. The image display panel according to claim 6, wherein a volume occupying rate of the particles or the liquid powders sealed between the substrates is in a range of 3-70 vol %.

15. The image display panel according to claim 6, wherein: the particles or the liquid powders to be accommodated in the cell having different colors and different charge characteristics and having different charge potentials; and the particles or the liquid powders, to which an electrostatic field is applied, are made to move so as to display an image.

* * * * *